US010080156B2

(12) United States Patent
Tan et al.

(10) Patent No.: US 10,080,156 B2
(45) Date of Patent: Sep. 18, 2018

(54) METHOD AND NETWORK ELEMENT FOR ACQUIRING INFORMATION ABOUT PACKET

(71) Applicant: HUAWEI TECHNOLOGIES CO., LTD., Shenzhen (CN)

(72) Inventors: Shiyong Tan, Beijing (CN); Xiaoyan Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 405 days.

(21) Appl. No.: 14/710,795

(22) Filed: May 13, 2015

(65) Prior Publication Data
US 2015/0245239 A1 Aug. 27, 2015

Related U.S. Application Data

(63) Continuation of application No. PCT/CN2012/084515, filed on Nov. 13, 2012.

(51) Int. Cl.
*H04W 4/00* (2018.01)
*H04W 28/02* (2009.01)
(Continued)

(52) U.S. Cl.
CPC ..... *H04W 28/0252* (2013.01); *H04L 41/0893* (2013.01); *H04L 45/745* (2013.01);
(Continued)

(58) Field of Classification Search
CPC ............... H04L 41/5019; H04L 45/745; H04L 41/0893; H04M 15/66; H04W 4/24; H04W 72/0413; H04W 28/0252; H04W 28/0215
See application file for complete search history.

(56) References Cited

U.S. PATENT DOCUMENTS

2009/0081998 A1 3/2009 Ueno et al.
2011/0317718 A1 12/2011 Siddam et al.
(Continued)

FOREIGN PATENT DOCUMENTS

CN 101834743 9/2010
CN 102547648 7/2012
(Continued)

OTHER PUBLICATIONS

3GPP TS 29.212 Release 11, Sep. 2012.*
(Continued)

*Primary Examiner* — Yemane Mesfin
*Assistant Examiner* — Abdelillah Elmejjarmi
(74) *Attorney, Agent, or Firm* — Staas & Halsey LLP

(57) ABSTRACT

The present invention provides a method and a network element for acquiring information about a packet. The method includes: after a UE establishes a bearer, sending, by a first network element, a first acquiring request to a second network element, where the first acquiring request is used to instruct the second network element to acquire information about a packet that is transmitted between the UE and a packet data network PDN and passes through the second network element; and receiving, by the first network element, information about a packet, where the information about the packet is sent by the second network element, and the information about the packet is information that is about a packet and is collected by the second network element according to the first acquiring request.

11 Claims, 12 Drawing Sheets

(51) Int. Cl.
*H04L 12/741* (2013.01)
*H04W 72/04* (2009.01)
*H04L 12/24* (2006.01)
*H04W 4/24* (2018.01)
*H04M 15/00* (2006.01)

(52) U.S. Cl.
CPC ... *H04W 28/0215* (2013.01); *H04W 72/0413* (2013.01); *H04L 41/5019* (2013.01); *H04M 15/66* (2013.01); *H04W 4/24* (2013.01)

(56) References Cited

U.S. PATENT DOCUMENTS

| | | | |
|---|---|---|---|
| 2012/0069749 | A1 | 3/2012 | Famolari et al. |
| 2012/0233324 | A1 | 9/2012 | Zhou et al. |
| 2012/0233325 | A1 | 9/2012 | Zhou et al. |
| 2012/0278472 | A1 | 11/2012 | Ellis et al. |
| 2013/0250968 | A1* | 9/2013 | Zhou ................ H04L 61/2007 370/431 |
| 2015/0304865 | A1* | 10/2015 | Poscher ............ H04W 76/02 370/252 |

FOREIGN PATENT DOCUMENTS

| | | |
|---|---|---|
| CN | 102740270 | 10/2012 |
| WO | 2012/119656 A1 | 9/2012 |
| WO | 2014/067562 A1 | 5/2014 |

OTHER PUBLICATIONS

Chinese Office Action dated May 4, 2016 in corresponding Chinese Patent Application No. 201280003086.2.
"Usage monitoring solution for subscriber group", SA WG2 Meeting #92, Jul. 9-13, 2012, Barcelona, Spain, S2-122804, 4 pages.
Japanese Office Action dated Jun. 7, 2016 in corresponding Japanese Patent Application No. 2015-540987.
PCT International Search Report dated Jul. 25, 2013 in corresponding International Patent Application No. PCT/CN2012/084515.
"3$^{rd}$ Generation Partnership Project; Technical Specification Group Services and System Aspects; Policy and charging control architecture (Release 11)", 3GPP TS 23.203, V11.7.0, Sep. 2012, pp. 1-178.
"3$^{rd}$ Generation Partnership Project; Technical Specification Group Services and System Aspects; General Packet Radio Service (GPRS); Service description; Stage 2 (Release 11)", 3GPP TS 23.060, V11.3.0, Sep. 2012, pp. 1-333.
International Search Report dated Jul. 25, 2013 in corresponding international application PCT/CN2012/084515.
Extended European Search Report dated Dec. 16, 2015 in corresponding European Patent Application No. 12888344.4.
"3$^{rd}$ Generation Partnership Project; Technical Specification Group Services and System Aspects; Usage Monitoring Control Pcc Enhancement; (Release 12)", 3GPP TR 23.858, V0.6.1, Aug. 2012, pp. 1-20.
"3$^{rd}$ Generation Partnership Project; Technical Specification Group Core Network and Terminals; Policy and Charging Control (PCC); Reference points (Release 11k", 3GPP TS 29.212, V11.6.0, Sep. 2012, pp. 1-194.
European Office Action dated Oct. 20, 2017 from European Patent Application No. 12888344.4, 9 pages.
"3rd Generation Partnership Project; Technical Specification Group Services and System Aspects; Study on Policy solutions and enhancements (Release 11)", 3GPP Standard; 3GPP TR 23.813, 3RD Generation Partnership Project (3GPP), Mobile Competence Centre; 650, Route Des Lucioles; F-06921 Sophia-Antipolis Cedex; France, vol. SA WG2, No. V11.0.0, Jun. 10, 2011, XP051292183, 42 pages.
"3rd Generation Partnership Project; Technical Specification Group Core Network and Terminals; Policy and Charging Control over Rx reference point (Release 11)", 3GPP Standard; 3GPP TS 29.214, 3rd Generation Partnership Project (3GPP), Mobile Competence Centre; 650, Route Des Lucioles; F-06921 Sophia-Antipolis Cedex; France, vol. CT WG3, No. V11.6.0, 21 Sep. 2012, XP050649634, 54 pages.
Japanese Office Action dated Apr. 13, 2018 from Japanese Patent Application No. 2017-083200, 4 pages.
Japanese Office Action dated Jun. 12, 2018 from Japanese Patent Application No. 2015-540987, 11 pages.

* cited by examiner

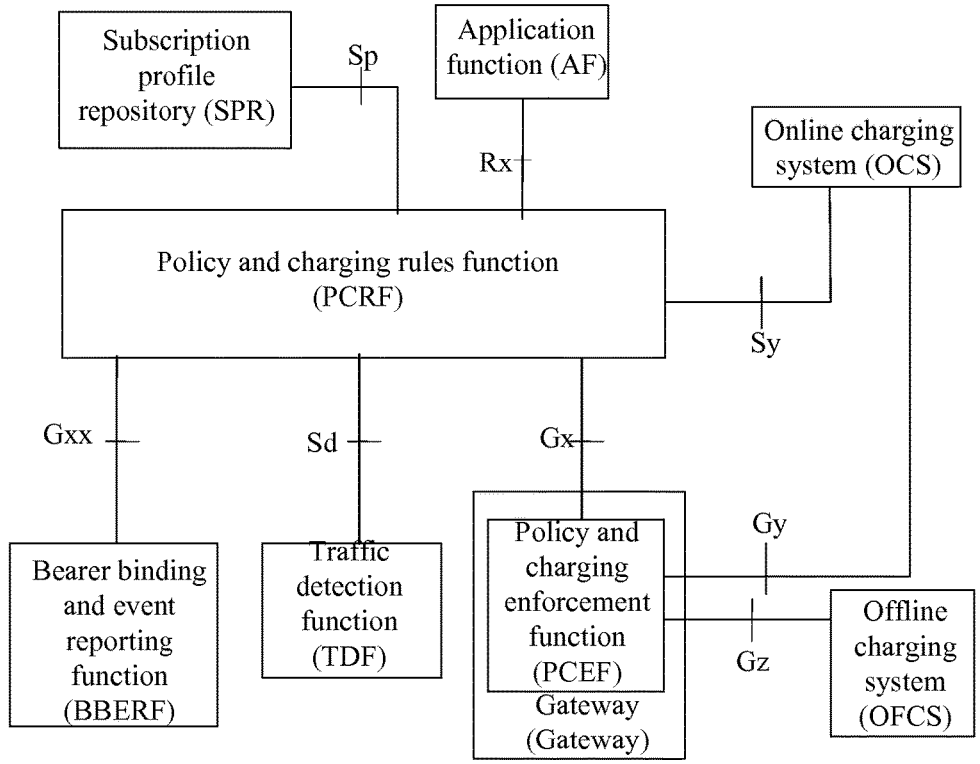

FIG. 3

| After a UE establishes a bearer, a first network element sends a first acquiring request to a second network element, where the first acquiring request is used to instruct the second network element to acquire information about a packet that is between the UE and a PDN and passes through the second network element | 401 |

| The first network element receives information about a packet, where the information about the packet is sent by the second network element, and the information about the packet is information that is about a packet and is collected by the second network element according to the first acquiring request | 402 |

FIG. 4A

531: After a UE establishes a bearer, a first network element receives a second acquiring request that includes an identifier of the UE and information about a specified reported-to server address and is sent by a third network element, where the second acquiring request is used to instruct the first network element to acquire, from a second network element, information about a packet corresponding to the identifier of the UE, so that the second network element reports the collected information about the packet corresponding to the identifier of the UE to a server corresponding to the information about the specified reported-to server address 532: The first network element sends a first acquiring request including the identifier of the UE and the information about the specified reported-to server address to the second network element according to the second acquiring request, so that the second network element, after receiving the first acquiring request, collects the information about the packet corresponding to the identifier of the UE, and the second network element reports the information about the packet to the server corresponding to the information about the specified reported-to server address

FIG. 5D

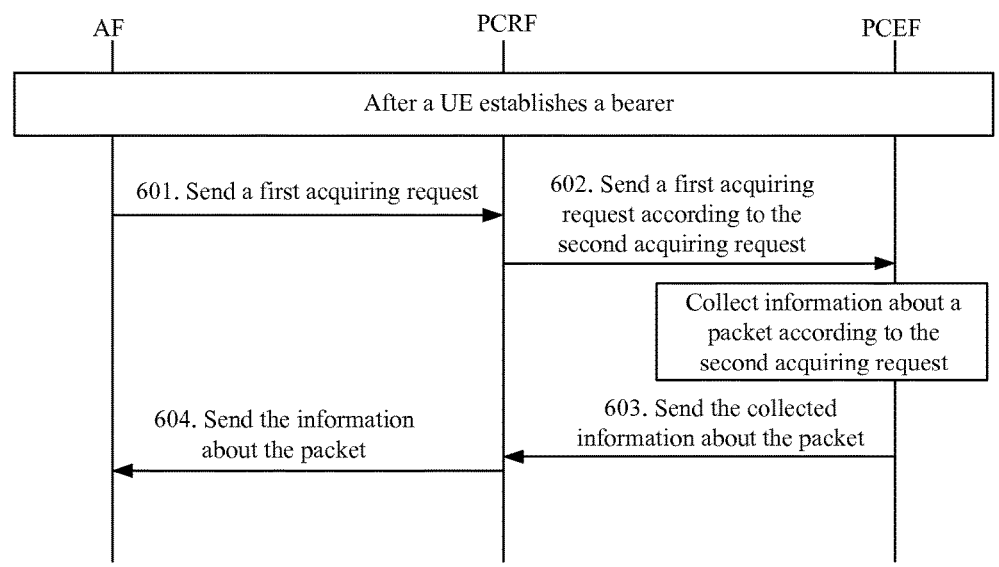

FIG. 6A

METHOD AND NETWORK ELEMENT FOR ACQUIRING INFORMATION ABOUT PACKET

CROSS-REFERENCE TO RELATED APPLICATION

This application is a continuation of International Application No. PCT/CN2012/084515, filed on Nov. 13, 2012, which is hereby incorporated by reference in its entirety.

TECHNICAL FIELD

The present invention relates to communications technologies, and in particular, to a method and a network element for acquiring information about a packet.

BACKGROUND

To implement different policy and charging control on a different service data stream, the 3rd Generation Partnership Project (The 3rd Generation Partnership Project, 3GPP for short) defines a policy and charging control (Policy and Charging Control, PCC for short) system. The PCC system includes functional entities, such as a policy and charging rules function (Policy and Charging Rules Function, PCRF for short) entity, a policy and charging enforcement function (Policy and Charging Enforcement Function, PCEF for short) entity, a traffic detection function (Traffic Detection Function, TDF for short) entity, a bearer binding and event reporting function (Bearer Binding and Event Reporting Function, BBERF for short) entity, a subscription profile repository (Subscription Profile Repository, SPR for short), and an application function (Application Function, AF for short) entity.

In the PCC system, a set of event subscription mechanisms is defined. The AF may subscribe to an event provided by the PCRF; the PCRF further subscribes to a related event provided by entities such as the PCEF, the BBERF, and the TDF; and when the event occurs, the PCEF reports the event to the PCRF, and the PCRF further reports the event to the AF. The PCRF itself may also subscribe to an event provided by the PCEF, the BBERF, and the TDF as an input of a PCRF decision.

Events that are provided by the PCRF and can be subscribed to by the AF include: charging association information exchange, bearer loss, bearer release, bearer recovery, a change of an access network type, quota exhaustion of a prepaid user, a resource allocation success, a resource allocation failure, a change of a user equipment (User Equipment, UE for short) location, a change of a UE time zone, and the like.

Events that are provided by the PCEF and can be subscribed to by the PCRF include: a change of quality of service (Quality of Service, QoS for short), a change of a serving general packet radio service support node (Serving GPRS Support Node, SGSN for short), a change of an access network type, bearer loss, bearer recovery, quota exhaustion of a prepaid user, quota restoration of a prepaid user, Internet Protocol (Internet Protocol, IP for short) address allocation for a UE, IP address release for a UE, a change of an access gateway, a resource allocation success, a change of a UE location, a change of a UE time zone, and the like.

However, in an existing PCC system, an AF or a PCRF can acquire some events on a bearer plane but cannot acquire information about a packet. The information of the packet is significantly important for increasing transparency for a channel and for an AF, a service provider to which the AF belongs, in enhancing understanding of a pipeline transmission feature and correspondingly adjusting a service, improving user service experience, and locating a service fault cause. Therefore, how to acquire information about a packet relating to the user equipment by using a PCC system becomes a technical problem that needs to be solved currently.

SUMMARY

In view of this, the present invention provides a method and a network element for acquiring information about a packet, so as to solve a problem that a PCC system cannot acquire information about a packet relating to a user equipment in the prior art.

According to a first aspect, an embodiment of the present invention provides a method for acquiring information about a packet, including:

after a UE establishes a bearer, sending, by a first network element, a first acquiring request to a second network element, where the first acquiring request is used to instruct the second network element to acquire information about a packet that is transmitted between the UE and a PDN and passes through the second network element; and receiving, by the first network element, information about a packet, where the information about the packet is collected by the second network element according to the first acquiring request and sent by the second network element.

With reference to the first aspect, in a first possible implementation manner, before the step of sending, by a first network element, a first acquiring request to a second network element, the method further includes:

receiving, by the first network element, a second acquiring request sent by a third network element, where the second acquiring request is used to instruct the first network element to acquire, from the second network element, the information about the packet that is transmitted between the UE and the PDN and passes through the second network element;

the sending, by a first network element, a first acquiring request to a second network element includes:

sending, by the first network element, the first acquiring request to the second network element according to the second acquiring request; and after the step of receiving, by the first network element, information about a packet, where the information about the packet is sent by the second network element, the method further includes:

sending, by the first network element, the information about the packet to the third network element.

With reference to the first aspect and the foregoing possible implementation manner, in a second possible implementation manner, if the first acquiring request includes at least an identifier of the UE, the sending, by a first network element, a first acquiring request to a second network element includes:

sending, by the first network element, the first acquiring request including the identifier of the UE to the second network element, where the first acquiring request is used to instruct the second network element to acquire the information about the packet that is between the UE corresponding to the identifier of the UE and the PDN and passes through the second network element.

With reference to the first aspect and the first possible implementation manner, in a third possible implementation manner, if the second acquiring request includes at least an identifier of the UE, and the first acquiring request includes at least the identifier of the UE, the receiving, by the first network element, a second acquiring request sent by a third network element includes:

receiving, by the first network element, the second acquiring request that includes the identifier of the UE and is sent by the third network element, where the second acquiring request is used to instruct the first network element to acquire, from the second network element, the information about the packet that is between the UE corresponding to the identifier of the UE and the PDN and passes through the second network element; and the sending, by a first network element, a first acquiring request to a second network element includes:

sending, by the first network element, the first acquiring request including the identifier of the UE to the second network element, where the first acquiring request is used to instruct the second network element to acquire the information about the packet that is between the UE corresponding to the identifier of the UE and the PDN and passes through the second network element.

With reference to the first aspect and the foregoing possible implementation manner, in a fourth possible implementation manner, the method further includes:

receiving, by the first network element, a second packet information cancellation request that includes the identifier of the UE and is sent by the third network element, where the second packet information cancellation request is used to instruct the first network element to send, to the second network element, a first packet information cancellation request for canceling acquiring of the information about the packet corresponding to the identifier of the UE; and sending, by the first network element, the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

With reference to the first aspect and the fourth possible implementation manner, in a fifth possible implementation manner, after the step of sending, by the first network element, the first packet information cancellation request including the identifier of the UE to the second network element, the method further includes:

if the second network element, before receiving the first packet information cancellation request, further collects the information about the packet that is between the UE corresponding to the identifier of the UE and the PDN and passes through the second network element, receiving, by the first network element, the information about the packet, where the information about the packet is collected by the second network element and sent by the second network element; and sending, by the first network element, the information about the packet to the third network element.

With reference to the first aspect and the first possible implementation manner, in a sixth possible implementation manner, after the step of receiving, by the first network element, a second acquiring request sent by a third network element and before the step of sending, by a first network element, a first acquiring request to a second network element, the method further includes:

determining, by the first network element, that authorization information of the UE exists in subscription information of the UE, where:

the authorization information of the UE is information that the UE allows providing of the information about the packet transmitted between the UE and the PDN.

With reference to the first aspect and the third possible implementation manner, in a seventh possible implementation manner, after the step of receiving, by the first network element, a second acquiring request sent by a third network element and before the step of sending, by a first network element, a first acquiring request to a second network element, the method further includes:

acquiring, by the first network element, from an SPR/UDR according to the identifier of the UE, subscription information of the UE corresponding to the identifier of the UE; and determining, by the first network element, that authorization information of the UE exists in the subscription information of the UE, where:

the authorization information of the UE is information that the UE allows providing of the information about the packet transmitted between the UE and the PDN.

With reference to the first aspect and the third possible implementation manner, in an eighth possible implementation manner, after the step of receiving, by the first network element, a second acquiring request sent by a third network element and before the step of sending, by a first network element, a first acquiring request to a second network element, the method further includes:

sending, by the first network element, an authorization request to the UE corresponding to the identifier of the UE, where the authorization request includes information that the UE allows providing of the information about the packet transmitted between the UE and the PDN; and if the UE allows the providing of the information about the packet transmitted between the UE and the PDN, receiving, by the first network element, authorization information of the UE that is sent by the UE according to the authorization request, where:

the authorization information of the UE is the information that the UE allows the providing of the information about the packet transmitted between the UE and the PDN.

With reference to the first aspect, in a ninth possible implementation manner, if the first acquiring request includes at least information about a specified file server address, the sending, by a first network element, a first acquiring request to a second network element includes:

sending, by the first network element, the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

With reference to the first aspect and the first possible implementation manner, in a tenth possible implementation manner, the second acquiring request includes at least information about a specified file server address, and the first acquiring request includes at least the information about the specified file server address;

the receiving, by the first network element, a second acquiring request sent by a third network element includes:

receiving, by the first network element, the second acquiring request that includes the information about the specified file server address and is sent by the third network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address; and the sending, by a first network element, a first acquiring request to a second network element includes:

sending, by the first network element, the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to the file server corresponding to the information about the specified file server address.

With reference to the first aspect, in an eleventh possible implementation manner, the first acquiring request includes at least information about a specified reported-to server address;

the sending, by a first network element, a first acquiring request to a second network element includes:

sending, by the first network element, the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to a server corresponding to the information about the specified reported-to server address.

With reference to the first aspect and the first possible implementation manner, in a twelfth possible implementation manner, the second acquiring request includes at least information about a specified reported-to file server address, and the first acquiring request includes at least the information about the specified reported-to server address;

the receiving, by the first network element, a second acquiring request sent by a third network element includes:

receiving, by the first network element, the second acquiring request that includes the information about the specified reported-to server address and is sent by the third network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address; and the sending, by a first network element, a first acquiring request to a second network element includes:

sending, by the first network element, the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to the server corresponding to the information about the specified reported-to server address.

With reference to the first aspect and any one of the foregoing possible implementation manners, in a thirteenth possible implementation manner, the third network element is an AF or a first capability exposure system;

the first network element is a PCRF or a second capability exposure system; and the second network element is a PCEF, a TDF, a BBERF, a gateway, or a base station.

With reference to the first aspect, in a fourteenth possible implementation manner, the first acquiring request includes at least a filtering condition or indication information; and the sending, by a first network element, a first acquiring request to a second network element includes:

sending, by the first network element, the first acquiring request including the filtering condition to the second network element, where the first acquiring request is used to instruct the second network element to acquire, according to the filtering condition, the information about the packet that is transmitted between the UE and the PDN and passes through the second network element;

or the sending, by a first network element, a first acquiring request to a second network element includes:

sending, by the first network element, the first acquiring request including the indication information to the second network element, where the first acquiring request is used to instruct the second network element to acquire, according to the indication information, the information about the packet that is transmitted between the UE and the PDN and passes through the second network element.

With reference to the first aspect and the first possible implementation manner, in a fifteenth possible implementation manner, the second acquiring request includes at least a filtering condition or indication information, and the first acquiring request includes at least the filtering condition or the indication information;

the sending, by a first network element, a first acquiring request to a second network element includes:

sending, by the first network element, the first acquiring request including the filtering condition to the second network element, where the first acquiring request is used to instruct the second network element to acquire, according to the filtering condition, the information about the packet that is transmitted between the UE and the PDN and passes through the second network element; and the receiving, by the first network element, a second acquiring request sent by a third network element includes:

receiving, by the first network element, the second acquiring request that includes the filtering condition and is sent by the third network element, where the second acquiring request is used to instruct the first network element to acquire, from the second network element, the information about the packet that is transmitted between the UE and the PDN and passes through the second network element, where the information about the packet is collected by the second network element according to the filtering condition;

or the sending, by a first network element, a first acquiring request to a second network element includes:

sending, by the first network element, the first acquiring request including the indication information to the second network element, where the first acquiring request is used to instruct the second network element to acquire, according to the indication information, the information about the packet that is transmitted between the UE and the PDN and passes through the second network element; and the receiving, by the first network element, a second acquiring request sent by a third network element includes:

receiving, by the first network element, the second acquiring request that includes the indication information and is sent by the third network element, where the second acquiring request is used to instruct the first network element to acquire, from the second network element, the information about the packet that is transmitted between the UE and the PDN and passes through the second network element, where the information about the packet is collected by the second network element according to the indication information.

According to a second aspect, an embodiment of the present invention provides a method for acquiring information about a packet, including:

after a UE establishes a bearer, sending, by a third network element, a second acquiring request to a first network element, where the second acquiring request is used to instruct the first network element to acquire, from a second network element, information about a packet that is transmitted between the UE and a PDN and passes through the second network element, so that the first network element acquires the information about the packet from the second network element according to the second acquiring request, where the information about the packet is collected by the second network element; and receiving, by the third network element, the information about the packet, where the information about the packet is sent by the first network element.

With reference to the second aspect, in a first possible implementation manner, the second acquiring request includes at least an identifier of the UE; and the sending, by a third network element, a second acquiring request to a first network element includes:

sending, by the third network element, the second acquiring request including the identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

With reference to the second aspect, in a second possible implementation manner, the method further includes:

sending, by the third network element, a second packet information cancellation request to the first network element, where the second packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

With reference to the second aspect, in a third possible implementation manner, the second acquiring request includes at least information about a specified reported-to server address; and the sending, by a third network element, a second acquiring request to a first network element includes:

sending, by the third network element, the second acquiring request including the information about the specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

With reference to the second aspect, in a fourth possible implementation manner, the second acquiring request includes at least information about a specified file server address; and the sending, by a third network element, a second acquiring request to a first network element includes:

sending, by the third network element, the second acquiring request including the information about the specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

With reference to the second aspect and the foregoing possible implementation manner, in a fifth possible implementation manner, the third network element is an AF or a first capability exposure system;

the first network element is a PCRF or a second capability exposure system; and the second network element is a PCEF, a TDF, a BBERF, a gateway, or a base station.

With reference to the second aspect and the foregoing possible implementation manner, in a sixth possible implementation manner, the second acquiring request includes at least a filtering condition or indication information; and the sending, by a third network element, a second acquiring request to a first network element includes:

sending, by the third network element, the second acquiring request including the filtering condition to the first network element, where the second acquiring request is used to instruct the first network element to acquire, from the second network element according to the filtering condition, the information about the packet that is transmitted between the UE and the PDN and passes through the second network element;

or the sending, by a third network element, a second acquiring request to a first network element includes:

sending, by the third network element, the second acquiring request including the indication information to the first network element, where the second acquiring request is used to instruct the first network element to acquire, from the second network element according to the indication information, the information about the packet that is transmitted between the UE and the PDN and passes through the second network element.

According to a third aspect, an embodiment of the present invention provides a method for acquiring information about a packet, including:

after a UE establishes a bearer, receiving, by a second network element, a first acquiring request sent by a first network element, where the first acquiring request is used to instruct the second network element to acquire information about a packet that is transmitted between the UE and a PDN and passes through the second network element; and collecting, by the second network element, the information about the packet according to the first acquiring request, and sending the collected information about the packet to the first network element.

With reference to the third aspect, in a first possible implementation manner, the first acquiring request is sent by the first network element after the first network element receives a second acquiring request sent by a third network element.

With reference to the third aspect, in a second possible implementation manner, the first acquiring request includes at least an identifier of the UE;

the receiving, by a second network element, a first acquiring request sent by a first network element includes:

receiving, by the second network element, the first acquiring request that includes the identifier of the UE and is sent by the first network element, where the first acquiring request is used to instruct the second network element to acquire the information about the packet that is between the UE corresponding to the identifier of the UE and the packet data network PDN and passes through the second network element; and the collecting, by the second network element, the information about the packet according to the first acquiring request includes:

collecting, by the second network element according to the first acquiring request, the information about the packet corresponding to the identifier of the UE.

With reference to the third aspect, in a third possible implementation manner, the second network element receives a first packet information cancellation request sent by the first network element and cancels, according to the first packet information cancellation request, collecting of the information about the packet that is transmitted between the UE and the PDN and passes through the second network element.

With reference to the third aspect and the third possible implementation manner, in a fourth possible implementation manner, the first packet information cancellation request is sent by the first network element after the first network element receives a second packet information cancellation request sent by a third network element.

With reference to the third aspect, in a fifth possible implementation manner, the first acquiring request includes at least information about a specified file server address;

the receiving, by a second network element, a first acquiring request sent by a first network element includes:

receiving, by the second network element, the first acquiring request that includes the information about the specified file server address and is sent by the first network element, where the first acquiring request is used to instruct the second network element to acquire the information about the packet that is between the UE corresponding to an identifier of the UE and the packet data network PDN and passes through the second network element, to store the information about the packet as a file, and to upload the file to a file server corresponding to the information about the specified file server address; and the collecting, by the second network element, the information about the packet according to the first acquiring request, and sending the collected information about the packet to the first network element includes:

collecting, by the second network element, the information about the packet according to the first acquiring request, storing the collected information about the packet as a file, and uploading the file to the file server corresponding to the information about the specified file server address;

or the first acquiring request includes at least information about a specified reported-to server address;

the receiving, by a second network element, a first acquiring request sent by a first network element includes:

receiving, by the second network element, the first acquiring request that includes the information about the specified reported-to server address and is sent by the first network element, where the first acquiring request is used to instruct the second network element to acquire the information about the packet that is between the UE corresponding to an identifier of the UE and the packet data network PDN and passes through the second network element, and to upload the collected information about the packet to a server corresponding to the information about the specified reported-to server address; and the collecting, by the second network element, the information about the packet according to the first acquiring request, and sending the collected information about the packet to the first network element includes:

collecting, by the second network element, the information about the packet according to the first acquiring request, and uploading the collected information about the packet to the server corresponding to the information about the specified reported-to server address.

With reference to the third aspect and the fifth possible implementation manner, in a sixth possible implementation manner, before the step of uploading the file to the file server corresponding to the information about the specified file server address, the method further includes:

establishing, by the second network element, a data transmission channel with the file server according to the information about the specified file server address;

or before the step of uploading the collected information about the packet to the server corresponding to the information about the specified reported-to server address, the method further includes:

establishing, by the second network element, a data transmission channel with the server according to the information about the specific reported-to server address.

With reference to the third aspect, in a seventh possible implementation manner, the first acquiring request includes at least a filtering condition or indication information; and the receiving, by a second network element, a first acquiring request sent by a first network element includes:

receiving, by the second network element, the first acquiring request that includes the filtering condition and is sent by the first network element, where the first acquiring request is used to instruct the second network element to acquire, according to the filtering condition, the information about the packet that is between the UE corresponding to an identifier of the UE and the packet data network PDN and passes through the second network element;

or the receiving, by a second network element, a first acquiring request sent by a first network element includes:

receiving, by the second network element, the first acquiring request that includes the indication information and is sent by the first network element, where the first acquiring request is used to instruct the second network element to acquire, according to the indication information, the information about the packet that is between the UE corresponding to an identifier of the UE and the packet data network PDN and passes through the second network element.

With reference to the third aspect and any one of the foregoing possible implementation manners, in an eighth possible implementation manner, the third network element is an AF or a first capability exposure system;

the first network element is a PCRF or a second capability exposure system; and the second network element is a PCEF, a TDF, a BBERF, a gateway, or a base station.

In a fourth aspect, an embodiment of the present invention provides a network element, including:

a sending unit, configured to, after a user equipment UE establishes a bearer, send a first acquiring request to a second network element, where the first acquiring request is used to instruct the second network element to acquire information about a packet that is transmitted between the UE and a packet data network PDN and passes through the second network element; and a receiving unit, configured to, after the sending unit sends the first acquiring request, receive information about a packet, where the information about the packet is sent by the second network element, and the information about the packet is collected by the second network element according to the first acquiring request.

With reference to the fourth aspect, in a first possible implementation manner, the receiving unit is further configured to, before the sending unit sends the first acquiring request, receive a second acquiring request sent by a third network element, where the second acquiring request is used to instruct the network element to acquire, from the second network element, the information about the packet that is transmitted between the UE and the PDN and passes through the second network element; and the sending unit is specifically configured to, after the receiving unit receives the second acquiring request, send the first acquiring request to the second network element according to the second acquiring request, and further configured to send the information about the packet to the third network element, where the information about the packet is received by the receiving unit.

With reference to the fourth aspect and the foregoing possible implementation manner, in a second possible implementation manner, the sending unit is specifically configured to send the first acquiring request including an identifier of the UE to the second network element, where the first acquiring request is used to instruct the second network element to acquire the information about the packet that is between the UE corresponding to the identifier of the UE and the PDN and passes through the second network element.

With reference to the fourth aspect and the second possible implementation manner, in a third possible implementation manner, the receiving unit is specifically configured to, before the sending unit sends the first acquiring request, receive the second acquiring request that includes an identifier of the UE and is sent by the third network element, where the second acquiring request is used to instruct the network element to acquire, from the second network element, the information about the packet that is between the UE corresponding to the identifier of the UE and the PDN and passes through the second network element; and the sending unit is specifically configured to, after the receiving unit receives the second acquiring request, send, according to the second acquiring request, the first acquiring request including the identifier of the UE to the second network element, where the first acquiring request is used to instruct the second network element to acquire the information about the packet that is between the UE corresponding to the identifier of the UE and the PDN and passes through the second network element.

With reference to the fourth aspect and the foregoing possible implementation manner, in a fourth possible implementation manner, the receiving unit is further configured to, after the sending unit sends the information about the packet, receive a second packet information cancellation request that includes the identifier of the UE and is sent by the third network element, where the second packet information cancellation request is used to instruct the network element to send a first packet information cancellation request to the second network element, so that the second network element cancels, according to the first packet information cancellation request, acquiring of the information about the packet corresponding to the identifier of the UE; and the sending unit is configured to, after the receiving unit receives the second packet information cancellation request, send the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

With reference to the fourth aspect and the fourth possible implementation manner, in a fifth possible implementation manner, if the second network element, before receiving the first packet information cancellation request, further collects the information about the packet that is between the UE corresponding to the identifier of the UE and the PDN and passes through the second network element, the receiving unit is further configured to, after the sending unit sends the first packet information cancellation request, receive the information about the packet, where the information about the packet is collected by the second network element and sent by the second network element; and the sending unit is further configured to send the information about the packet to the third network element, where the information about the packet is received by the receiving unit.

With reference to the fourth aspect and the first possible implementation manner, in a sixth possible implementation manner, the network element further includes:

a determining unit, configured to, after the receiving unit receives the second acquiring request and before the sending unit sends the first acquiring request, determine that authorization information of the UE exists in subscription information of the UE, where:

the authorization information of the UE is information that the UE allows providing of the information about the packet transmitted between the UE and the PDN.

With reference to the fourth aspect and the third possible implementation manner, in a seventh possible implementation manner, the network element further includes:

an acquiring unit, configured to, after the receiving unit receives the second acquiring request and before the sending unit sends the first acquiring request, acquire, from a subscription profile repository SPR or a user data repository UDR according to the identifier of the UE, subscription information of the UE corresponding to the identifier of the UE; and a determining unit, configured to, after the acquiring unit acquires the subscription information of the UE, determine that authorization information of the UE exists in the subscription information of the UE, where:

the authorization information of the UE is information that the UE allows providing of the information about the packet transmitted between the UE and the PDN.

With reference to the fourth aspect and the third possible implementation manner, in an eighth possible implementation manner, the sending unit is further configured to, after the receiving unit receives the second acquiring request and before the sending unit sends the first acquiring request, send an authorization request to the UE corresponding to the identifier of the UE, where the authorization request includes information that the UE allows providing of the information about the packet transmitted between the UE and the PDN; and if the UE allows the providing of the information about the packet transmitted between the UE and the PDN, the receiving unit is further configured to, after the sending unit sends the authorization request, receive authorization information of the UE that is sent by the UE according to the authorization request, where:

the authorization information of the UE is the information that the UE allows the providing of the information about the packet transmitted between the UE and the PDN.

With reference to the fourth aspect, in a ninth possible implementation manner, the sending unit is specifically configured to send the first acquiring request including information about a specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

With reference to the fourth aspect and the first possible implementation manner, in a tenth possible implementation manner, the receiving unit is configured to, before the sending unit sends the first acquiring request, receive the second acquiring request that includes information about a specified file server address and is sent by the third network element, where the second acquiring request is used to instruct the network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address; and the sending unit is configured to, after the receiving unit receives the second acquiring request including the information about the specified file server address, send the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to the file server corresponding to the information about the specified file server address.

With reference to the fourth aspect, in an eleventh possible implementation manner, the sending unit is specifically configured to send the first acquiring request including information about a specified reported-to server address to the second network element, where the first acquiring request is used to instruct the second network element to acquire the information about the packet that is transmitted between the UE and the PDN and passes through the second network element, so that the second network element uploads the collected information about the packet to a server corresponding to the information about the specified reported-to server address.

With reference to the fourth aspect and the first possible implementation manner, in a twelfth possible implementation manner, the receiving unit is configured to, before the sending unit sends the first acquiring request, receive the second acquiring request that includes information about a specified reported-to server address and is sent by the third network element, where the second acquiring request is used to instruct the network element to acquire, from the second network element, the information about the packet that is transmitted between the UE and the PDN and passes through the second network element, so that the second network element uploads the collected information about the packet to a server corresponding to the information about the specified reported-to server address; and the sending unit is configured to, after the receiving unit receives the second acquiring request including the information about the specified reported-to server address, send the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to the server corresponding to the information about the specified reported-to server address.

With reference to the fourth aspect and the foregoing possible implementation manner, in a thirteenth possible implementation manner, the third network element is an application function AF entity or a first capability exposure system;

the network element is a policy and charging rules function PCRF entity or a second capability exposure system; and the second network element is a policy and charging enforcement function PCEF entity, a service detection function TDF entity, a bearer binding and event reporting function BBERF entity, a gateway, or a base station.

With reference to the fourth aspect, in a fourteenth possible implementation manner, the sending unit is configured to send the first acquiring request including a filtering condition to the second network element, where the first acquiring request is used to instruct the second network element to acquire, according to the filtering condition, the information about the packet that is transmitted between the UE and the PDN and passes through the second network element;

or configured to send the first acquiring request including indication information to the second network element, where the first acquiring request is used to instruct the second network element to acquire, according to the indication information, the information about the packet that is transmitted between the UE and the PDN and passes through the second network element.

With reference to the fourth aspect and the first possible implementation manner, in a fifteenth possible implementation manner, the receiving unit is configured to, before the sending unit sends the first acquiring request, receive the second acquiring request that includes a filtering condition and is sent by the third network element, where the second acquiring request is used to instruct the network element to acquire, from the second network element, the information about the packet that is transmitted between the UE and the PDN and passes through the second network element, where the information about the packet is collected by the second network element according to the filtering condition; and the sending unit is configured to, after the receiving unit receives the second acquiring request including the filtering condition, send the first acquiring request including the filtering condition to the second network element, where the first acquiring request is used to instruct the second network element to acquire, according to the filtering condition, the information about the packet that is transmitted between the UE and the PDN and passes through the second network element;

or the receiving unit is configured to, before the sending unit sends the first acquiring request, receive the second acquiring request that includes indication information and is sent by the third network element, where the second acquiring request is used to instruct the network element to acquire, from the second network element, the information about the packet that is transmitted between the UE and the PDN and passes through the second network element, where the information about the packet is collected by the second network element according to the indication information; and the sending unit is configured to, after the receiving unit receives the second acquiring request including the indication information, send the first acquiring request including the indication information, where the first acquiring request is used to instruct the second network element to acquire, according to the indication information, the information about the packet that is transmitted between the UE and the PDN and passes through the second network element.

In a fifth aspect, an embodiment of the present invention further provides a network element, including:

a sending unit, configured to, after a user equipment UE establishes a bearer, send a second acquiring request to a first network element, where the second acquiring request is used to instruct the first network element to acquire, from a second network element, information about a packet that is transmitted between the UE and a packet data network PDN and passes through the second network element, so that the first network element acquires the information about the packet from the second network element according to the second acquiring request, where the information about the packet is collected by the second network element; and a receiving unit, configured to, after the sending unit sends the second acquiring request, receive the information about the packet, where the information about the packet is collected by the second network element and sent by the first network element.

With reference to the fifth aspect, in a first possible implementation manner, the sending unit is specifically configured to, after the UE establishes the bearer, send the second acquiring request including an identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

With reference to the fifth aspect, in a second possible implementation manner, the sending unit is further configured to, after the receiving unit receives the information about the packet, send a second packet information cancellation request to the first network element, where the second packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

With reference to the fifth aspect, in a third possible implementation manner, the sending unit is specifically configured to, after the UE establishes the bearer, send the second acquiring request including information about a specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

With reference to the fifth aspect, in a fourth possible implementation manner, the sending unit is specifically configured to, after the UE establishes the bearer, send the second acquiring request including information about a specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

With reference to the fifth aspect and the foregoing possible implementation manner, in a fifth possible implementation manner, the network element is an application function AF entity or a first capability exposure system;

the first network element is a policy and charging rules function PCRF entity or a second capability exposure system; and the second network element is a policy and charging enforcement function PCEF entity, a service detection function TDF entity, a bearer binding and event reporting function BBERF entity, a gateway, or a base station.

With reference to the fifth aspect and the foregoing possible implementation manner, in a sixth possible implementation manner, the sending unit is specifically configured to, after the UE establishes the bearer, send the second acquiring request including a filtering condition to the first network element, where the second acquiring request is used to instruct the first network element to acquire, from the second network element according to the filtering condition, the information about the packet that is transmitted between the UE and the PDN and passes through the second network element; or after the UE establishes the bearer, send the second acquiring request including indication information to the first network element, where the second acquiring request is used to instruct the first network element to acquire, from the second network element according to the indication information, the information about the packet that is transmitted between the UE and the PDN and passes through the second network element.

In a sixth aspect, an embodiment of the present invention further provides a network element, including:

a receiving unit, configured to, after a user equipment UE establishes a bearer, receive a first acquiring request sent by a first network element, where the first acquiring request is used to instruct the network element to acquire information about a packet that is transmitted between the UE and a packet data network PDN and passes through the network element;

a collecting unit, configured to, after the receiving unit receives the first acquiring request, collect the information about the packet according to the first acquiring request; and a sending unit, configured to send the information about the packet to the first network element, where the information about the packet is collected by the collecting unit.

With reference to the sixth aspect, in a first possible implementation manner, the first acquiring request is sent by the first network element after the first network element receives a second acquiring request sent by a third network element.

With reference to the sixth aspect, in a second possible implementation manner, the receiving unit is specifically configured to, after the UE establishes the bearer, receive the first acquiring request that includes an identifier of the UE and is sent by the first network element, where the first acquiring request is used to instruct the network element to acquire the information about the packet that is between the UE corresponding to the identifier of the UE and the packet data network PDN and passes through the network element; and the collecting unit is specifically configured to, after the receiving unit receives the first acquiring request including the identifier of the UE, collect, according to the first acquiring request, the information about the packet corresponding to the identifier of the UE.

With reference to the sixth aspect, in a third possible implementation manner, the receiving unit is configured to, after the sending unit sends the information about the packet, receive a first packet information cancellation request sent by the first network element and cancel, according to the first packet information cancellation request, collecting of the information about the packet that is transmitted between the UE and the PDN and passes through the network element.

With reference to the sixth aspect and the third possible implementation manner, in a fourth possible implementation manner, the first packet information cancellation request is sent by the first network element after the first network element receives a second packet information cancellation request sent by a third network element.

With reference to the sixth aspect, in a fifth possible implementation manner, the receiving unit is specifically configured to, after the UE establishes the bearer, receive the first acquiring request that includes information about a specified file server address and is sent by the first network element, where the first acquiring request is used to instruct the network element to acquire the information about the packet that is between the UE corresponding to an identifier of the UE and the packet data network PDN and passes through the network element, to store the information about the packet as a file, and to upload the file to a file server corresponding to the information about the specified file server address;

the collecting unit is specifically configured to, after the receiving unit receives the first acquiring request including the information about the specified file server address, collect the information about the packet according to the first acquiring request and store the collected information about the packet as a file; and the sending unit is further configured to upload the file stored by the collecting unit to the file server corresponding to the information about the specified file server address;

or the receiving unit is specifically configured to, after the UE establishes the bearer, receive the first acquiring request that includes information about a specified reported-to server address and is sent by the first network element, where the first acquiring request is used to instruct the network element to acquire the information about the packet that is between the UE corresponding to an identifier of the UE and the packet data network PDN and passes through the network element, and to upload the collected information about the packet to a server corresponding to the information about the specified reported-to server address;

the collecting unit is specifically configured to, after the receiving unit receives the first acquiring request including the information about the specified reported-to server address, collect the information about the packet according to the first acquiring request; and the sending unit is further configured to upload the information about the packet to the server corresponding to the information about the specified reported-to server address, where the information about the packet is collected by the collecting unit.

With reference to the sixth aspect and the fifth possible implementation manner, in a sixth possible implementation manner, the network element further includes:

an establishing unit, configured to, before the sending unit sends the file stored by the collecting unit, establish a data transmission channel with the file server according to the information about the specified file server address;

or an establishing unit, configured to, before the sending unit sends the information about the packet, establish a data transmission channel with the server according to the information about the specified reported-to server address, where the information about the packet is collected by the collecting unit.

With reference to the sixth aspect, in a seventh possible implementation manner, the receiving unit is configured to, after the UE establishes the bearer, receive the first acquiring request that includes a filtering condition and is sent by the first network element, where the first acquiring request is used to instruct the network element to acquire, according to the filtering condition, the information about the packet that is between the UE corresponding to an identifier of the UE and the packet data network PDN and passes through the network element;

or configured to, after the UE establishes the bearer, receive the first acquiring request that includes indication information and is sent by the first network element, where the first acquiring request is used to instruct the network element to acquire, according to the indication information, the information about the packet that is between the UE corresponding to an identifier of the UE and the packet data network PDN and passes through the network element.

With reference to the sixth aspect and the foregoing possible implementation manner, in an eighth possible implementation manner, the third network element is an application function AF entity or a first capability exposure system;

the first network element is a policy and charging rules function PCRF entity or a second capability exposure system; and the network element is a policy and charging enforcement function PCEF entity, a service detection function TDF entity, a bearer binding and event reporting function BBERF entity, a gateway, or a base station.

In a seventh aspect, an embodiment of the present invention further provides a network element, including:

a transmitter, configured to, after a user equipment UE establishes a bearer, send a first acquiring request to a second network element, where the first acquiring request is used to instruct the second network element to acquire information about a packet that is transmitted between the UE and a packet data network PDN and passes through the second network element; and a receiver, configured to, after the transmitter sends the first acquiring request, receive information about a packet, where the information about the packet is sent by the second network element, and the information about the packet is collected by the second network element according to the first acquiring request.

With reference to the seventh aspect, in a first possible implementation manner, the receiver is further configured to, before the transmitter sends the first acquiring request, receive a second acquiring request sent by a third network element, where the second acquiring request is used to instruct the network element to acquire, from the second network element, the information about the packet that is transmitted between the UE and the PDN and passes through the second network element; and the transmitter is specifically configured to, after the receiver receives the second acquiring request, send the first acquiring request to the second network element according to the second acquiring request, and further configured to send the information about the packet to the third network element, where the information about the packet is received by the receiver.

With reference to the seventh aspect and the foregoing possible implementation manner, in a second possible implementation manner, the transmitter is specifically configured to send the first acquiring request including an identifier of the UE to the second network element, where the first acquiring request is used to instruct the second network element to acquire the information about the packet that is between the UE corresponding to the identifier of the UE and the PDN and passes through the second network element.

With reference to the seventh aspect, in a third possible implementation manner, the receiver is specifically configured to, before the transmitter sends the first acquiring request, receive a second acquiring request that includes an identifier of the UE and is sent by a third network element, where the second acquiring request is used to instruct the network element to acquire, from the second network element, the information about the packet that is between the UE corresponding to the identifier of the UE and the PDN and passes through the second network element; and the transmitter is specifically configured to, after the receiver receives the second acquiring request, send, according to the second acquiring request, the first acquiring request including the identifier of the UE to the second network element, where the first acquiring request is used to instruct the second network element to acquire the information about the packet that is between the UE corresponding to the identifier of the UE and the PDN and passes through the second network element.

With reference to the seventh aspect and the foregoing possible implementation manner, in a fourth possible implementation manner, the receiver is further configured to, after the transmitter sends the information about the packet, receive a second packet information cancellation request that includes the identifier of the UE and is sent by the third network element, where the second packet information cancellation request is used to instruct the network element to send a first packet information cancellation request to the second network element, so that the second network element cancels, according to the first packet information cancellation request, acquiring of the information about the packet, where the information about the packet is the information about the packet corresponding to the identifier of the UE; and the transmitter is configured to, after the receiver receives the second packet information cancellation request, send the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

With reference to the seventh aspect and the fourth possible implementation manner, in a fifth possible implementation manner, if the second network element, before receiving the first packet information cancellation request, further collects the information about the packet that is between the UE corresponding to the identifier of the UE and the PDN and passes through the second network element, the receiver is further configured to, after the transmitter sends the first packet information cancellation request, receive the information about the packet, where the information about the packet is collected by the second network element and sent by the second network element; and the transmitter is further configured to send the information about the packet to the third network element, where the information about the packet is received by the receiver.

With reference to the seventh aspect and the third possible implementation manner, in a sixth possible implementation manner, the network element further includes:

a processor, configured to, after the receiver receives the second acquiring request and before the transmitter sends the first acquiring request, determine that authorization information of the UE exists in subscription information of the UE, where:

the authorization information of the UE is information that the UE allows providing of the information about the packet transmitted between the UE and the PDN.

With reference to the seventh aspect and the third possible implementation manner, in a seventh possible implementation manner, the network element further includes:

a processor, configured to, after the receiver receives the second acquiring request and before the transmitter sends the first acquiring request, acquire, from a subscription profile repository SPR or a user data repository UDR according to the identifier of the UE, subscription information of the UE corresponding to the identifier of the UE, and determine that authorization information of the UE exists in the subscription information of the UE, where:

the authorization information of the UE is information that the UE allows providing of the information about the packet transmitted between the UE and the PDN.

With reference to the seventh aspect and the third possible implementation manner, in an eighth possible implementation manner, the transmitter is further configured to, after the receiver receives the second acquiring request and before the transmitter sends the first acquiring request, send an authorization request to the UE corresponding to the identifier of the UE, where the authorization request includes information that the UE allows providing of the information about the packet transmitted between the UE and the PDN; and if the UE allows the providing of the information about the packet transmitted between the UE and the PDN, the receiver is further configured to, after the transmitter sends the authorization request, receive authorization information of the UE that is sent by the UE according to the authorization request, where:

the authorization information of the UE is the information that the UE allows the providing of the information about the packet transmitted between the UE and the PDN.

With reference to the seventh aspect, in a ninth possible implementation manner, the transmitter is specifically configured to send the first acquiring request including information about a specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

With reference to the seventh aspect and the first possible implementation manner, in a tenth possible implementation manner, the receiver is configured to, before the transmitter sends the first acquiring request, receive the second acquiring request that includes information about a specified file server address and is sent by the third network element, where the second acquiring request is used to instruct the network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address; and the transmitter is configured to, after the receiver receives the second acquiring request including the information about the specified file server address, send the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to the file server corresponding to the information about the specified file server address.

With reference to the seventh aspect, in an eleventh possible implementation manner, the transmitter is specifically configured to send the first acquiring request including information about a specified reported-to server address to the second network element, where the first acquiring request is used to instruct the second network element to acquire the information about the packet that is transmitted between the UE and the PDN and passes through the second network element, so that the second network element uploads the collected information about the packet to a server corresponding to the information about the specified reported-to server address.

With reference to the seventh aspect, in a twelfth possible implementation manner, the receiver is configured to, before the transmitter sends the first acquiring request, receive the second acquiring request that includes information about a specified reported-to server address and is sent by the third network element, where the second acquiring request is used to instruct the network element to acquire, from the second network element, the information about the packet that is transmitted between the UE and the PDN and passes through the second network element, so that the second network element uploads the collected information about the packet to a server corresponding to the information about the specified reported-to server address; and the transmitter is configured to, after the receiver receives the second acquiring request including the information about the specified reported-to server address, send the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to the server corresponding to the information about the specified reported-to server address.

With reference to the seventh aspect and the foregoing possible implementation manner, in a thirteenth possible implementation manner, the third network element is an application function AF entity or a first capability exposure system;

the network element is a policy and charging rules function PCRF entity or a second capability exposure system; and the second network element is a policy and charging enforcement function PCEF entity, a service detection function TDF entity, a bearer binding and event reporting function BBERF entity, a gateway, or a base station.

With reference to the seventh aspect, in a fourteenth possible implementation manner, the transmitter is configured to send the first acquiring request including a filtering condition to the second network element, where the first acquiring request is used to instruct the second network element to acquire, according to the filtering condition, the information about the packet that is transmitted between the UE and the PDN and passes through the second network element;

or configured to send the first acquiring request including indication information to the second network element, where the first acquiring request is used to instruct the second network element to acquire, according to the indication information, the information about the packet that is transmitted between the UE and the PDN and passes through the second network element.

With reference to the seventh aspect, in a fifteenth possible implementation manner, the receiver is configured to, before the transmitter sends the first acquiring request, receive the second acquiring request that includes a filtering condition and is sent by the third network element, where the second acquiring request is used to instruct the network element to acquire, from the second network element, the information about the packet that is transmitted between the UE and the PDN and passes through the second network element, where the information about the packet is collected by the second network element according to the filtering condition; and the transmitter is configured to, after the receiver receives the second acquiring request including the filtering condition, send the first acquiring request including the filtering condition to the second network element, where the first acquiring request is used to instruct the second network element to acquire, according to the filtering condition, the information about the packet that is transmitted between the UE and the PDN and passes through the second network element;

or the receiver is configured to, before the transmitter sends the first acquiring request, receive the second acquiring request that includes indication information and is sent by the third network element, where the second acquiring request is used to instruct the network element to acquire, from the second network element, the information about the packet that is transmitted between the UE and the PDN and passes through the second network element, where the information about the packet is collected by the second network element according to the indication information; and the transmitter is configured to, after the receiver receives the second acquiring request including the indication information, send the first acquiring request including the indication information, where the first acquiring request is used to instruct the second network element to acquire, according to the indication information, the information about the packet that is transmitted between the UE and the PDN and passes through the second network element.

In an eighth aspect, an embodiment of the present invention further provides a network element, including:

a transmitter, configured to, after a user equipment UE establishes a bearer, send a second acquiring request to a first network element, where the second acquiring request is used to instruct the first network element to acquire, from a second network element, information about a packet that is transmitted between the UE and a packet data network PDN and passes through the second network element, so that the first network element acquires the information about the packet from the second network element according to the second acquiring request, where the information about the packet is collected by the second network element; and a receiver, configured to, after the transmitter sends the second acquiring request, receive the information about the packet, where the information about the packet is collected by the second network element and sent by the first network element.

With reference to the eighth aspect, in a first possible implementation manner, the transmitter is specifically configured to, after the UE establishes the bearer, send the second acquiring request including an identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

With reference to the eighth aspect, in a second possible implementation manner, the transmitter is further configured to, after the receiver receives the information about the packet, send a second packet information cancellation request to the first network element, where the second packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

With reference to the eighth aspect, in a third possible implementation manner, the transmitter is specifically configured to, after the UE establishes the bearer, send the second acquiring request including information about a specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

With reference to the eighth aspect, in a fourth possible implementation manner, the transmitter is specifically configured to, after the UE establishes the bearer, send the second acquiring request including information about a specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

With reference to the eighth aspect and the foregoing possible implementation manner, in a fifth possible implementation manner, the network element is an application function AF entity or a first capability exposure system;

the first network element is a policy and charging rules function PCRF entity or a second capability exposure system; and the second network element is a policy and charging enforcement function PCEF entity, a service detection function TDF entity, a bearer binding and event reporting function BBERF entity, a gateway, or a base station.

With reference to the eighth aspect and the foregoing possible implementation manner, in a sixth possible implementation manner, the transmitter is specifically configured to, after the UE establishes the bearer, send the second acquiring request including a filtering condition to the first network element, where the second acquiring request is used to instruct the first network element to acquire, from the second network element according to the filtering condition, the information about the packet that is transmitted between the UE and the PDN and passes through the second network element; or after the UE establishes the bearer, send the second acquiring request including indication information to the first network element, where the second acquiring request is used to instruct the first network element to acquire, from the second network element according to the indication information, the information about the packet that is transmitted between the UE and the PDN and passes through the second network element.

In a seventh aspect, an embodiment of the present invention further provides a network element, including:

a receiver, configured to, after a user equipment UE establishes a bearer, receive a first acquiring request sent by a first network element, where the first acquiring request is used to instruct the network element to acquire information about a packet that is transmitted between the UE and a packet data network PDN and passes through the network element;

a processor, configured to, after the receiver receives the first acquiring request, collect the information about the packet according to the first acquiring request; and a transmitter, configured to send the information about the packet to the first network element, where the information about the packet is collected by the processor.

With reference to the ninth aspect, in a first possible implementation manner, the first acquiring request is sent by the first network element after the first network element receives a second acquiring request sent by a third network element.

With reference to the ninth aspect, in a second possible implementation manner, the receiver is specifically configured to, after the UE establishes the bearer, receive the first acquiring request that includes an identifier of the UE and is sent by the first network element, where the first acquiring request is used to instruct the second network element to acquire the information about the packet that is between the UE corresponding to the identifier of the UE and the packet data network PDN and passes through the second network element; and the processor is specifically configured to, after the receiver receives the first acquiring request including the identifier of the UE, collect, according to the first acquiring request, the information about the packet corresponding to the identifier of the UE.

With reference to the ninth aspect, in a third possible implementation manner, the receiver is configured to, after the transmitter sends the information about the packet, receive a first packet information cancellation request sent by the first network element and cancel, according to the first packet information cancellation request, collecting of the information about the packet that is transmitted between the UE and the PDN and passes through the second network element.

With reference to the ninth aspect and the third possible implementation manner, in a fourth possible implementation manner, the first packet information cancellation request is sent by the first network element after the first network element receives a second packet information cancellation request sent by a third network element.

With reference to the ninth aspect, in a fifth possible implementation manner, the receiver is specifically configured to, after the UE establishes the bearer, receive the first acquiring request that includes information about a specified file server address and is sent by the first network element, where the first acquiring request is used to instruct the second network element to acquire the information about the packet that is between the UE corresponding to an identifier of the UE and the packet data network PDN and passes through the second network element, to store the information about the packet as a file, and to upload the file to a file server corresponding to the information about the specified file server address;

the processor is specifically configured to, after the receiver receives the first acquiring request including the information about the specified file server address, collect the information about the packet according to the first acquiring request and store the collected information about the packet as a file; and the transmitter is further configured to upload the file stored by the processor to the file server corresponding to the information about the specified file server address;

or the receiver is specifically configured to, after the UE establishes the bearer, receive the first acquiring request that includes information about a specified reported-to server address and is sent by the first network element, where the first acquiring request is used to instruct the second network element to acquire the information about the packet that is between the UE corresponding to an identifier of the UE and the packet data network PDN and passes through the second network element, and to upload the collected information about the packet to a server corresponding to the information about the specified reported-to server address;

the processor is specifically configured to, after the receiver receives the first acquiring request including the information about the specified reported-to server address, collect the information about the packet according to the first acquiring request; and the transmitter is further configured to upload the information about the packet to the server corresponding to the information about the specified reported-to server address, where the information about the packet is collected by the processor.

With reference to the ninth aspect and the fifth possible implementation manner, in a sixth possible implementation manner, the processor is further configured to, before the transmitter sends the file stored by the processor, establish a data transmission channel with the file server according to the information about the specified file server address;

or configured to, before the transmitter sends the information about the packet, establish a data transmission channel with the server according to the information about the specified reported-to server address, where the information about the packet is collected by the processor.

With reference to the ninth aspect, in a seventh possible implementation manner, the receiver is configured to, after the UE establishes the bearer, receive the first acquiring request that includes a filtering condition and is sent by the first network element, where the first acquiring request is used to instruct the second network element to acquire, according to the filtering condition, the information about the packet that is between the UE corresponding to an identifier of the UE and the packet data network PDN and passes through the second network element;

or configured to, after the UE establishes the bearer, receive the first acquiring request that includes indication information and is sent by the first network element, where the first acquiring request is used to instruct the second network element to acquire, according to the indication information, the information about the packet that is between the UE corresponding to an identifier of the UE and the packet data network PDN and passes through the second network element.

With reference to the ninth aspect and the foregoing possible implementation manner, in an eighth possible implementation manner, the third network element is an application function AF entity or a first capability exposure system;

the first network element is a policy and charging rules function PCRF entity or a second capability exposure system; and the network element is a policy and charging enforcement function PCEF entity, a service detection function TDF entity, a bearer binding and event reporting function BBERF entity, a gateway, or a base station.

It can be known from the foregoing technical solutions that, according to the method and the network element for acquiring information about a packet in the present invention, a first network element acquires, from a second network element, information about a packet that is between a UE and a PDN and passes through the second network element, and further the first network element receives information about a packet, where the information about the packet is collected by the second network element and sent by the second network element. In this way, a problem that a PCC system cannot acquire information about a packet relating to a user equipment in the prior art is solved.

BRIEF DESCRIPTION OF DRAWINGS

To describe the technical solutions of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 3 is a diagram of a network architecture of a PCC system in the prior art;

FIG. 4A to FIG. 4F are schematic flowcharts of methods for acquiring information about a packet according to an embodiment of the present invention;

FIG. 5A to FIG. 5D are schematic flowcharts of methods for acquiring information about a packet according to another embodiment of the present invention;

FIG. 6A to FIG. 6D are schematic flowcharts of methods for acquiring information about a packet according to another embodiment of the present invention;

DESCRIPTION OF EMBODIMENTS

To make the objectives, technical solutions, and advantages of the present invention more comprehensible, the following clearly describes the technical solutions in the embodiments of the present invention with reference to the accompanying drawings in the embodiments of the present invention. Apparently, the following described embodiments are merely a part of the embodiments of the present invention. Based on the following embodiments of the present invention, persons of ordinary skill in the art may also derive other embodiments used to solve the technical problem of the present invention and achieve the technical effect of the present invention by making equivalent changes to some or all technical features without any creative effort, and these changes evidently do not depart from the scope disclosed in the present invention.

Figure 1:
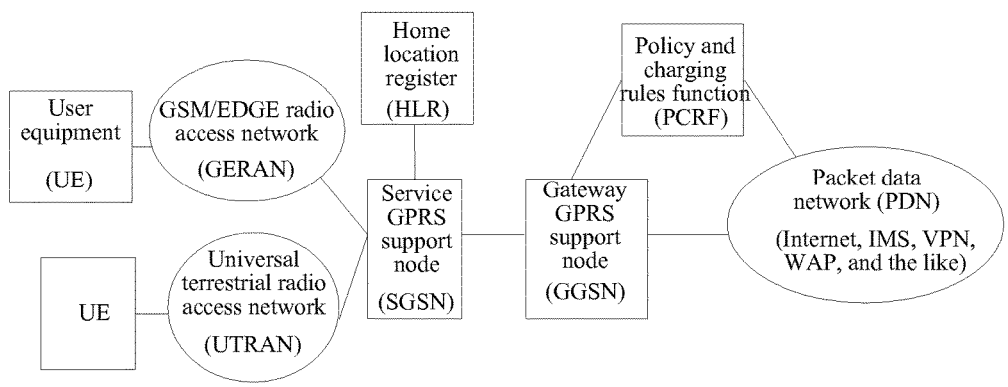
FIG. 1 is a diagram of an architecture of a mobile packet network in the prior art.

A 2G/3G mobile packet network architecture defined in the 3GPP TS 23.060 is shown in FIG. 1. A universal terrestrial radio access network (Universal Terrestrial Radio Access Network, UTRAN for short) implements a radio access function on a universal mobile terrestrial service (Universal Mobile Terrestrial Service, UMTS for short) network (that is, a 3G network). A GSM/EDGE radio access network (GSM/EDGE Radio Access Network, GERAN for short) implements a radio access function on a general packet radio service (General Packet Radio Service, GPRS for short) (that is, a packet data part in a 2G network) network.

Figure 2:
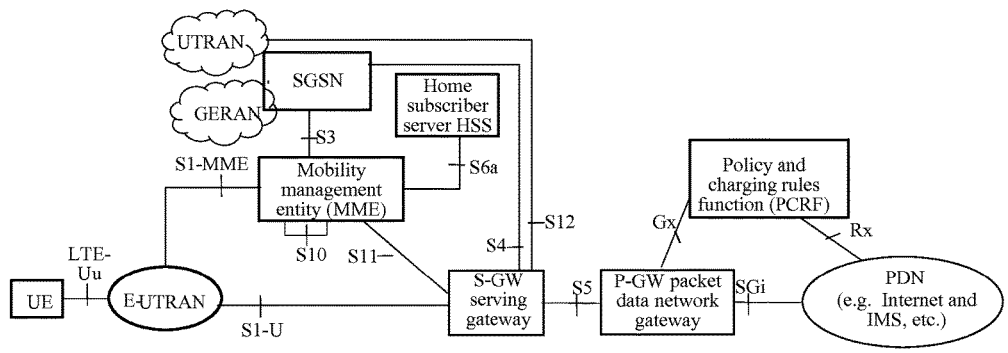
FIG. 2 is a diagram of an SAE network architecture in the prior art.

In the 3GPP standard version R8 phase, a new evolved network is developed and its system architecture is shown in FIG. 2. An evolved UTRAN (Evolved UTRAN, E-UTRAN for short) implements all functions relating to radio access to the evolved network.

In a system architecture evolution (System Architecture Evolution, SAE for short) architecture, a mobility management entity (Mobility Management Entity, MME for short) only needs to process signaling on a control plane, and a serving gateway (Serving Gateway, S-GW for short) and a packet data network gateway (Packet Data Network Gateway, P-GW for short) are mainly responsible for forwarding data on a user plane. The S-GW and the P-GW may be combined into one network element, which are collectively called a gateway.

The foregoing only briefly describes a communications network architecture, and a function of each network element device and a communications system are not limited herein. For example, a radio access network may be another non-3GPP device, such as WiFi. All following embodiments are applicable to any foregoing communications system.

To implement different policy and charging control on a different service data stream, the 3GPP defines a PCC system. The PCC system is an optional feature of a mobile packet network (2G, 3G, or system architecture evolution (System Architecture Evolution, SAE for short)), and it may be determined, according to an operator requirement, whether the PCC system is deployed.

As shown in FIG. 3, FIG. 3 shows an architecture of a PCC system. In some systems, an SPR is substituted by a user data repository (User Data Repository, UDR for short), and an Sp interface is correspondingly substituted by a Ud interface, which are only differences of system implementation manners. Both the SPR and the UDR store subscription data of a user in the terms of function. Content in this specification is applicable to both system architectures and no differentiation is made in the following. In addition, the PCC system also has an architecture for a roaming scenario. Embodiments of the present invention make no difference to a roaming architecture and are still applicable, and therefore no further details are provided herein.

In an existing PCC system, an AF or a PCRF can acquire some events on a bearer plane but cannot acquire information about a packet. However, the information about the packet is significantly important for increasing transparency for a channel and for an AF, a service provider to which the AF belongs, in enhancing understanding of a pipeline transmission feature and correspondingly adjusting a service, improving user service experience, and locating a service fault.

Information about a packet includes: information about a single packet (such as a sequence number, a direction, and a time stamp) and/or packet statistics information (such as QoS statistics information and packet traffic statistics information). The information is quite useful for the AF or the service provider to which the AF belongs. For example, when a fault occurs to a service, it may be determined, by using the information, whether the fault is caused by a mobile broadband network (including a path from a UE to a PCEF) or is caused by an internal fault of a packet data network (Packet Data Network, PDN for short). In addition, by using information about a packet, QoS conditions of a mobile network and a PDN may be clearly known, and then a service is adjusted correspondingly, for example, coding/decoding algorithms of an audio stream and a video stream are changed. For example, a delay and jitter of a packet on the mobile network and a delay and jitter of a packet on the PDN network may be calculated by using time stamps of multiple packets; a packet loss rate of a packet on the mobile network and a packet loss rate of a packet on the PDN network may be calculated by using a sequence number of the packet; and whether a packet is modified in a transmission process, modified content, and the like may be determined by using all or part of content of the packet.

The embodiments of the present invention are to solve a problem that an AF or another network element cannot acquire information about a packet and content of the packet by using a PCC system. According to any one of the following embodiments, an AF or another network element (such as a management system of a service provider) can acquire information about a packet by using a PCC system. It should be noted that the packet herein refers to a packet that is sent bidirectionally between a UE and a network element on the PDN. Information about a packet in the embodiments of the present invention includes: information about a single packet and/or packet statistics information. The information about the single packet includes one or more types of the following information: a packet sequence number, a packet direction, a packet receiving time stamp, a packet sending time stamp, a packet size, a packet header field, information about whether the packet is discarded, and all or part of content of the packet.

The packet statistics information includes one or more types of the following information:

statistics information about the number of packets, statistics information about the number of packets of different packet lengths, packet traffic statistics information, and QoS statistics information, where the QoS statistics information includes but is not limited to a maximum bandwidth, a minimum bandwidth, an average bandwidth, an available bandwidth, the number of lost packets, a packet loss rate, jitter, a delay, and the like.

FIG. 4A shows a method for acquiring information about a packet according to an embodiment of the present invention. As shown in FIG. 4A, the method for acquiring information about a packet in this embodiment is described as follows:

401. After a UE establishes a bearer, a first network element sends a first acquiring request to a second network element, where the first acquiring request is used to instruct the second network element to acquire information about a packet that is transmitted between the UE and a PDN and passes through the second network element.

402. The first network element receives information about a packet, where the information about the packet is sent by the second network element, and the information about the packet is information that is about a packet and is collected by the second network element according to the first acquiring request.

For example, if the first network element is a PCRF, and the second network element is a PCEF, a data transmission channel for transmitting information relating to the UE exists between the PCRF and the PCEF after the UE establishes the bearer. Therefore, the PCRF may send the first acquiring request through the channel, and in this case, the PCEF can learn, after receiving the first acquiring request, information about a packet corresponding to which UE needs to be acquired.

It can be known from the foregoing embodiment that, according to the method for acquiring information about a packet in this embodiment, a first network element acquires, from a second network element, information about a packet that is between a UE and a PDN and passes through the second network element, and further, the first network element receives information about a packet, where the information about the packet is collected by the second network element and sent by the second network element. In this way, a problem that a PCC system cannot acquire information about a packet relating to a user equipment in the prior art is solved.

Optionally, if the first network element is a second capability exposure system, and the second network element is a base station, a gateway, or a PCEF, in this case, the first acquiring request in step 401 in the foregoing includes at least an identifier of the UE and correspondingly, the method for acquiring information about a packet includes the following step 401' and step 402' that are not shown in the figure.

401'. After the UE establishes the bearer, the first network element sends the first acquiring request including the identifier of the UE to the second network element, where the first acquiring request is used to instruct the second network element to acquire the information about the packet that is between the UE corresponding to the identifier of the UE and the PDN and passes through the second network element.

For example, the identifier of the UE includes but is not limited to an IP address, an access point name (Access Point Name, APN for short), an international mobile subscriber identity (International Mobile Subscriber Identity, IMSI for short), a mobile station international ISDN number (Mobile Station International ISDN number, MSISDN for short), and the like of the UE.

402'. The first network element receives information about a packet, where the information about the packet is sent by the second network element, the information about the packet is the information about the packet of the UE corresponding to the identifier of the UE, and the information about the packet is collected by the second network element according to the first acquiring request.

According to the foregoing, with the method for acquiring information about a packet, a problem that a PCC system cannot acquire information about a packet relating to a user equipment in the prior art is solved through interaction between a first network element and a second network element.

It may be understood that the first acquiring request includes at least a filtering condition or indication information (such as first indication information and second indication information that are used as examples in the following other embodiments) and correspondingly, the first network element sends the first acquiring request to the second network element, which includes:

sending, by the first network element, the first acquiring request including a filtering condition to the second network element, where the first acquiring request is used to instruct the second network element to acquire, according to the filtering condition, the information about the packet that is transmitted between the UE and the PDN and passes through the second network element; or the first network element sends the first acquiring request to the second network element, which includes:

sending, by the first network element, the first acquiring request including indication information to the second network element, where the first acquiring request is used to instruct the second network element to acquire, according to the indication information, the information about the packet that is transmitted between the UE and the PDN and passes through the second network element, and the like.

For example, the filtering condition includes one or more types of the following information: an application type, IP quintuple information, a packet direction, a discarded packet, an acceptable packet, and a time period; and the indication information includes one or more types of the following information:

a sampling rate, the total number of samples, a sampling period, an upper limit of the number of sampled packets in unit time, an upper limit of sampled traffic in unit time, an upper limit of a packet content length, a frequency for performing packet statistics collection, a frequency for reporting information about a packet, the number of times of reporting information about a packet, a network element for performing packet information statistics collection, a condition for ending acquiring of information about a packet, and the like.

The condition for ending acquiring of information about a packet includes: time, the number of packets, that packet traffic reaches a preset value, that the number of sampled packets reaches a preset threshold, that sampled packet traffic reaches another preset threshold, or the like. Content of the filtering condition and the indication information in this embodiment is only a brief example, and other content that may belong to the filtering condition or the indication information shall fall within the scope of this embodiment.

Figure 4B:
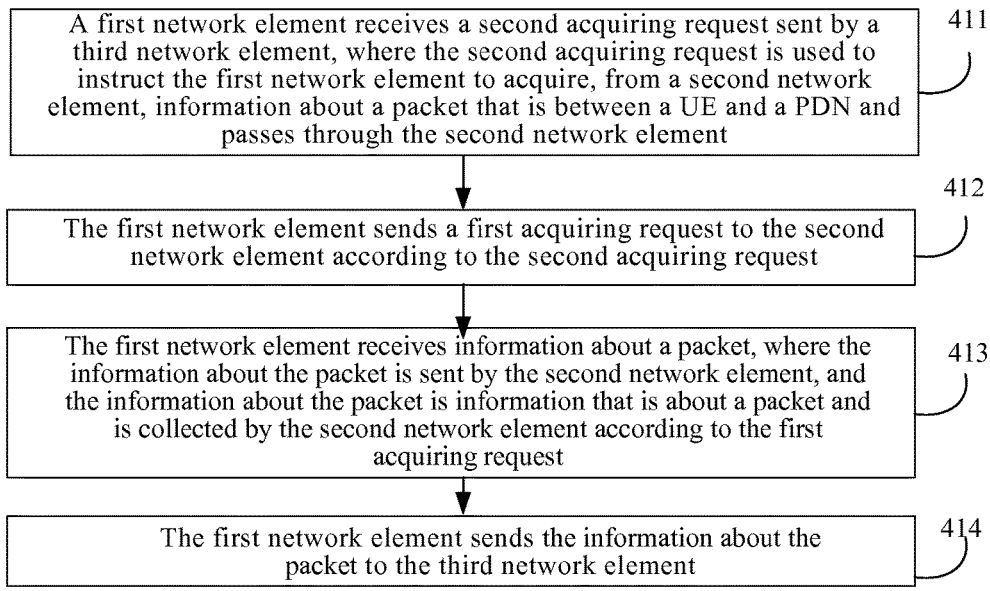

FIG. 4B shows a method for acquiring information about a packet according to an embodiment of the present invention. As shown in FIG. 4B, the method for acquiring information about a packet in this embodiment is described as follows:

411. A first network element receives a second acquiring request sent by a third network element, where the second acquiring request is used to instruct the first network element to acquire, from a second network element, information about a packet that is transmitted between a UE and a PDN and passes through the second network element.

412. The first network element sends a first acquiring request to the second network element according to the second acquiring request.

413. The first network element receives information about a packet, where the information about the packet is sent by the second network element, and the information about the packet is information that is about a packet and is collected by the second network element according to the first acquiring request.

414. The first network element sends the information about the packet to the third network element.

For example, if the third network element is an AF, the first network element is a PCRF, and the second network element is a PCEF, a data transmission channel used for a UE session is established between the third network element and the first network element after the UE establishes the session, and further, the third network element sends the second acquiring request to the first network element through the data transmission channel, so that the first network element can directly learn information about a packet of which UE is to be acquired by the second network element.

Correspondingly, the first network element may transmit the first acquiring request through a data transmission channel that is established between the first network element and the second network element and used for the UE session.

That is, the third network element, the first network element, and the second network element may determine the UE by default and further send information or a request to each other, where the information or the request does not include an identifier of the UE.

It can be known from the foregoing embodiment that, according to the method for acquiring information about a packet in this embodiment, a first network element sends a first acquiring request to a second network element after receiving a second acquiring request, so that the second network element collects information about a packet of a UE according to the first acquiring request, and further the first network element receives the information about the packet, where the information about the packet is collected by the second network element and send by the second network element, so as to send the information about the packet to a third network element. In this way, a problem that a PCC system cannot acquire information about a packet relating to a user equipment in the prior art is solved.

Figure 4C:
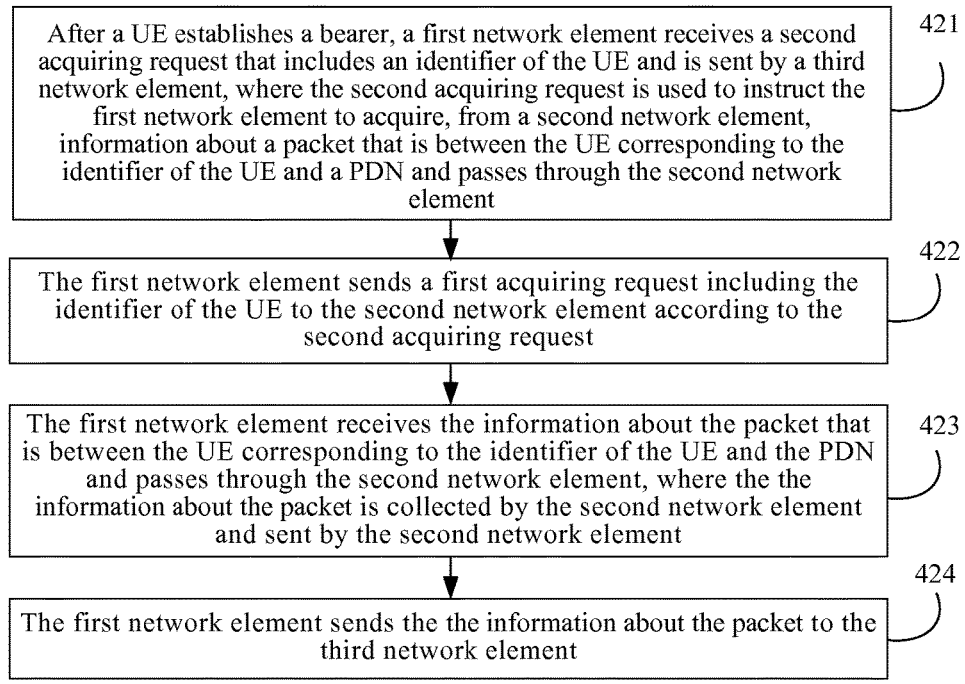

In an application scenario, if no data transmission channel dedicated for a certain UE exists between the third network element and the first network element, the second acquiring request sent by the third network element to the first network element includes at least an identifier of the UE. In this case, the method for acquiring information about a packet is shown in FIG. 4C and includes:

421. After a UE establishes a bearer, a first network element receives a second acquiring request that includes an identifier of the UE and is sent by a third network element, where the second acquiring request is used to instruct the first network element to acquire, from a second network element, information about a packet that is between the UE corresponding to the identifier of the UE and a PDN and passes through the second network element.

For example, the third network element is an AF, the first network element is a PCRF, and the second network element is a PCEF, a BBERF, or a TDF; or the third network element is a first capability exposure system, the first network element is a PCRF, and the second network element is a PCEF, a BBERF, or a TDF; or, the third network element is an AF, the first network element is a second capability exposure system, and the second network element is a gateway, a base station, or the like.

422. The first network element sends a first acquiring request including the identifier of the UE to the second network element according to the second acquiring request.

For example, the identifier of the UE includes but is not limited to an IP address, an APN, an IMSI, an MSISDN, and the like of the UE.

423. The first network element receives the information about the packet that is between the UE corresponding to the identifier of the UE and the PDN and passes through the second network element, where the information about the packet is collected by the second network element and sent by the second network element.

424. The first network element sends the information about the packet to the third network element.

Further, the third network element adjusts a service according to the information about the packet.

The information about the packet in this embodiment may include: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, and all or part of content of the packet.

The packet statistics information includes one or more types of the following information:

statistics information about the number of packets, statistics information about the number of packets of different packet lengths, packet traffic statistics information, and QoS statistics information, where the QoS statistics information includes but is not limited to a maximum bandwidth, a minimum bandwidth, an average bandwidth, an available bandwidth, the number of lost packets, a packet loss rate, jitter, a delay, and the like.

Definitely, in a practical application, the second acquiring request includes at least a filtering condition and/or indication information; and the first acquiring request sent by the first network element to the second network element according to the second acquiring request also includes at least the filtering condition and/or the indication information.

That is, the first network element receives the second acquiring request sent by the third network element, which includes:

receiving, by the first network element, the second acquiring request that includes the filtering condition and is sent by the third network element, where the second acquiring request is used to instruct the first network element to acquire, from the second network element, the information about the packet that is transmitted between the UE and the PDN and passes through the second network element, where the information about the packet is collected by the second network element according to the filtering condition; and the first network element sends the first acquiring request to the second network element, which includes:

sending, by the first network element, the first acquiring request including the filtering condition to the second network element, where the first acquiring request is used to instruct the second network element to acquire, according to the filtering condition, the information about the packet that is transmitted between the UE and the PDN and passes through the second network element;

or the first network element receives the second acquiring request sent by the third network element, which includes:

receiving, by the first network element, the second acquiring request that includes the indication information and is sent by the third network element, where the second acquiring request is used to instruct the first network element to acquire, from the second network element, the information about the packet that is transmitted between the UE and the PDN and passes through the second network element, where the information about the packet is collected by the second network element according to the indication information; and the first network element sends the first acquiring request to the second network element, which includes:

sending, by the first network element, the first acquiring request including the indication information to the second network element, where the first acquiring request is used to instruct the second network element to acquire, according to the indication information, the information about the packet that is transmitted between the UE and the PDN and passes through the second network element. For the filtering condition and the indication information, refer to descriptions in other embodiments.

It can be known from the foregoing embodiment that, according to the method for acquiring information about a packet in this embodiment, a first network element sends a first acquiring request to a second network element after receiving a second acquiring request, so that the second network element collects, according to the first acquiring request, information about a packet corresponding to an identifier of a UE, and further the first network element receives the information about the packet, where the information about the packet is collected by the second network element and send by the second network element, so as to send the information about the packet to a third network element. In this way, a problem that a PCC system cannot acquire information about a packet relating to a user equipment in the prior art is solved.

Figure 4D:
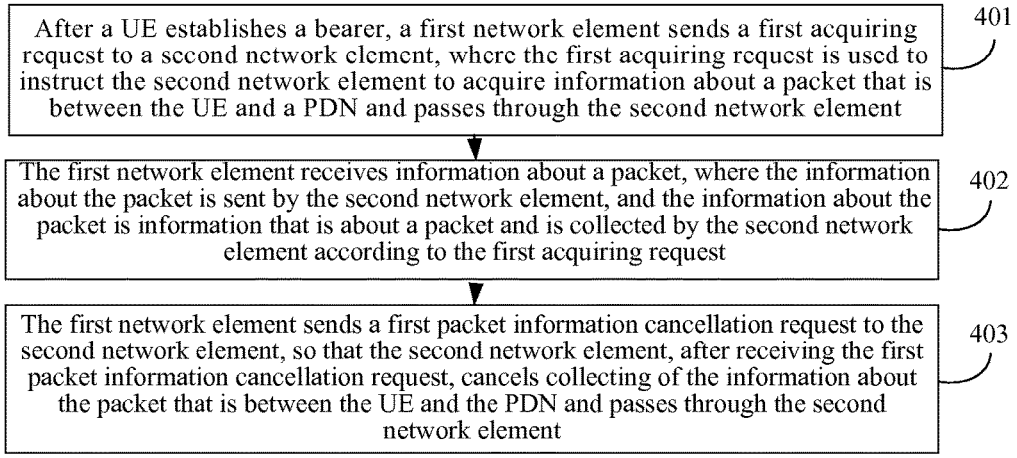

Based on the embodiment shown in FIG. 4A, FIG. 4D shows a method for acquiring information about a packet according to another embodiment of the present invention. As shown in FIG. 4D, the method for acquiring information about a packet in this embodiment further includes the following step 403.

403. The first network element sends a first packet information cancellation request to the second network element, so that the second network element, after receiving the first packet information cancellation request, cancels collecting of the information about the packet that is transmitted between the UE and the PDN and passes through the second network element.

Definitely, in a practical application, if the second network element further collects the information about the packet before receiving the first packet information cancellation request, the first network element may receive the information about the packet, where the information about the packet is collected by the second network element and sent by the second network element.

It may be understood that the first packet information cancellation request includes at least the identifier of the UE and other parameters are configured according to actual needs. For example, the first network element sends the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

Figure 4E:
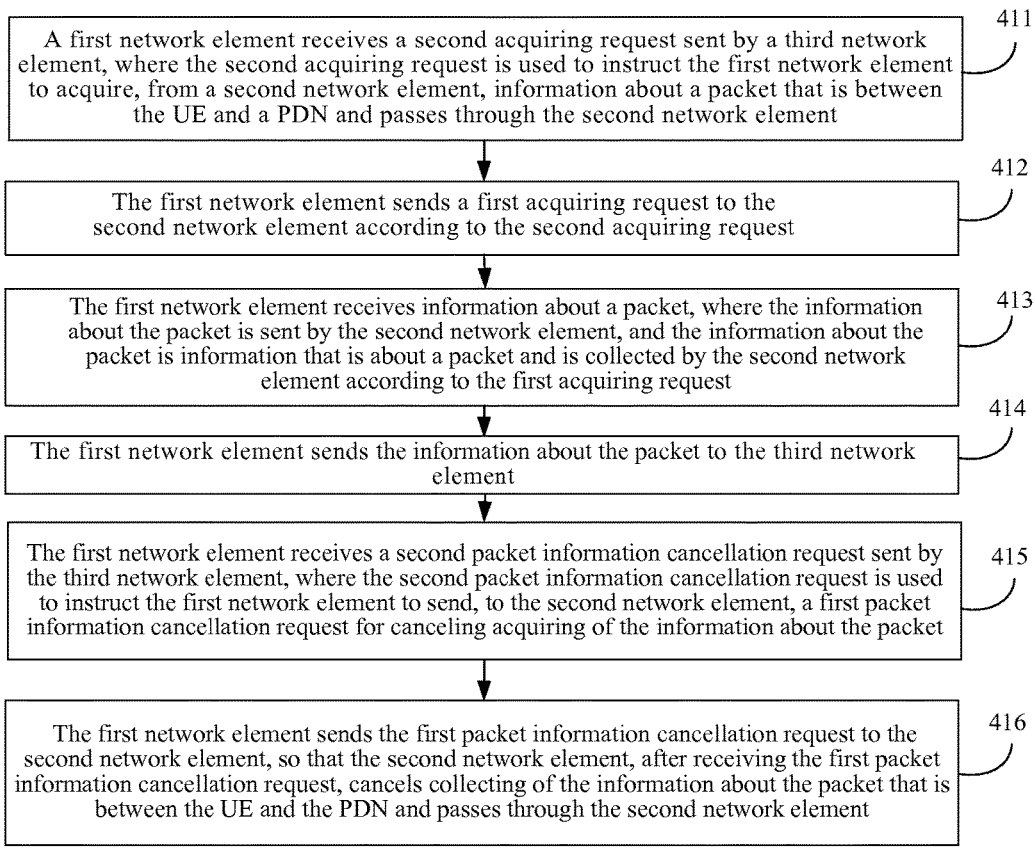

Based on the embodiment shown in FIG. 4B, FIG. 4E shows a method for acquiring information about a packet according to another embodiment of the present invention. As shown in FIG. 4E, the method for acquiring information about a packet in this embodiment further includes the following step 415 and step 416.

415. The first network element receives a second packet information cancellation request sent by the third network element, where the second packet information cancellation request is used to instruct the first network element to send, to the second network element, a first packet information cancellation request for canceling acquiring of the information about the packet.

416. The first network element sends the first packet information cancellation request to the second network element, so that the second network element, after receiving the first packet information cancellation request, cancels collecting of the information about the packet that is transmitted between the UE and the PDN and passes through the second network element.

It may be understood that in a practical application, the second packet information cancellation request includes at least the identifier of the UE, and the first packet information cancellation request includes at least the identifier of the UE.

Correspondingly, the first network element receives the second packet information cancellation request that includes the identifier of the UE and is sent by the third network element, where the second packet information cancellation request is used to instruct the first network element to send, to the second network element, the first packet information cancellation request for canceling acquiring of the information about the packet corresponding to the identifier of the UE.

The first network element sends the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

Optionally, in a practical application, based on the embodiment shown in FIG. 4E, after step 416, the method for acquiring information about a packet further includes the following step 417 and step 418 that are not shown in the figure.

417. If the second network element, before receiving the first packet information cancellation request, further collects the information about the packet that is between the UE corresponding to the identifier of the UE and the PDN and passes through the second network element, the first network element may receive the information about the packet, where the information about the packet is collected by the second network element and sent by the second network element.

418. The first network element sends the information about the packet to the third network element.

Figure 4F:
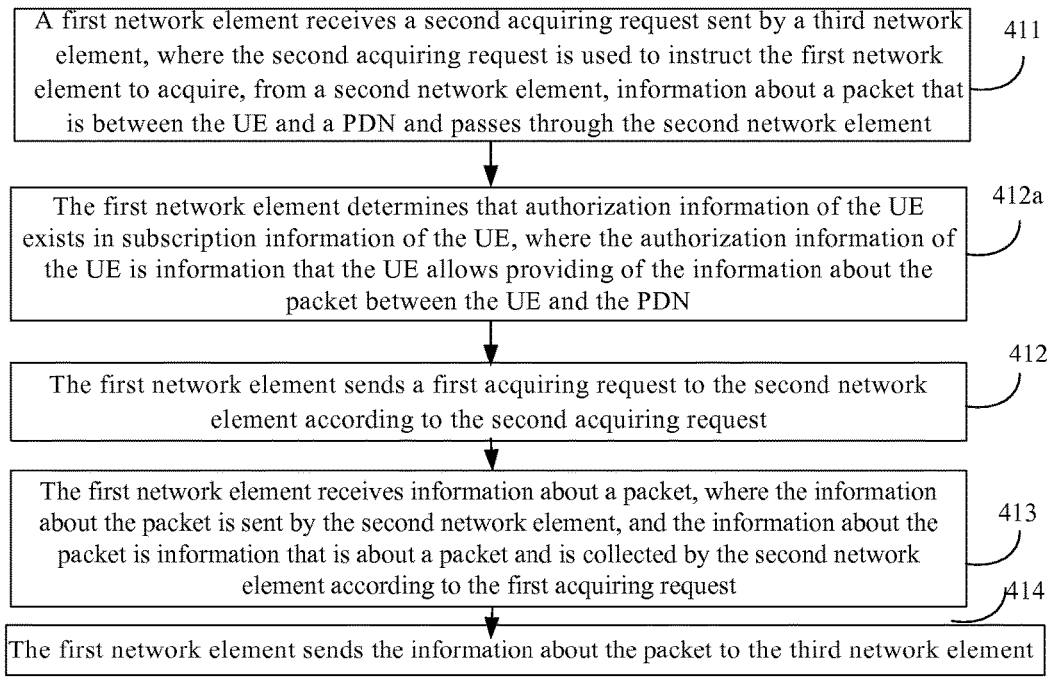

In an application scenario, as shown in FIG. 4F, based on FIG. 4B, before step 412, the method for acquiring information about a packet in this embodiment further includes the following step 412a:

412a. The first network element determines that authorization information of the UE exists in subscription information of the UE.

The authorization information of the UE is information that the UE allows providing of the information about the packet transmitted between the UE and the PDN.

That is, the first network element pre-acquires the subscription information of the UE when the UE establishes the bearer.

Alternatively, in another embodiment, the first network element determines authorization information of the UE according to the identifier of the UE and subscription information of the UE, where the authorization information of the UE is information that the UE allows providing of the information about the packet transmitted between the UE and the PDN.

Definitely, it should be noted that if the first network element determines, according to the subscription information of the UE, that the UE rejects providing of the information about the packet of the UE, the first network element rejects a request for acquiring information about a packet, that is, the second acquiring request, where the request for acquiring information about a packet is sent by the third network element.

In an optional embodiment, if no subscription information of the UE exists in the first network element, the first network element acquires, from an SPR/UDR according to the identifier of the UE, the subscription information of the UE corresponding to the identifier of the UE; and after acquiring the subscription information of the UE, the first network element determines that authorization information of the UE exists in the subscription information of the UE.

In another optional embodiment, if no subscription information of the UE exists in the first network element, the first network element may send an authorization request to the UE corresponding to the identifier of the UE, where the authorization request includes information that the UE allows providing of the information about the packet transmitted between the UE and the PDN; and if the UE allows disclosure of the information about the packet transmitted between the UE and the PDN, the first network element receives authorization information of the UE that is sent by the UE according to the authorization request.

Optionally, if the first network element is a capability exposure system, in this case, the authorization information of the UE, such as subscription information of a user, may be stored on a network element, such as an SPR, a UDR, a home subscriber server (Home Subscriber Server, HSS for short), or an HLR.

It may be understood that if the third network element is an AF, and the first network element is a PCRF, when the PCRF receives a second acquiring request that is used for acquiring information about a packet and sent by the AF, the PCRF may send a short message to the UE by using a short message system, so as to request a user to perform authorization, and the user may perform or reject authorization. If the user rejects the authorization, the PCRF sends a message notification to the AF and no longer performs a subsequent step; otherwise, the PCRF performs subsequent steps, such as step 412 to step 414, or step 412 to step 418.

With the method for acquiring information about a packet in this embodiment, a problem that a PCC system cannot acquire information about a packet relating to a user equipment in the prior art can be solved.

It should be understood that when the first network element is a PCRF, the third network element that requests packet statistics information from the PCRF is not limited to an AF, may be any network element, and includes but is not limited to a streaming media server that provides a service for the UE, a network management system, and the like.

In this case, with reference to FIG. 3, a prerequisite that an Rx session is established between the AF and the PCRF is no longer required in step 411. An Rx interface may be adopted between any third network element and the PCRF, or any other interface, such as an XML interface, may be adopted, which is not limited in this embodiment. For example, when the third network element is a network management system of a PCRF device, a network management interface may be adopted between the third network element and the PCRF.

Figure 5A:
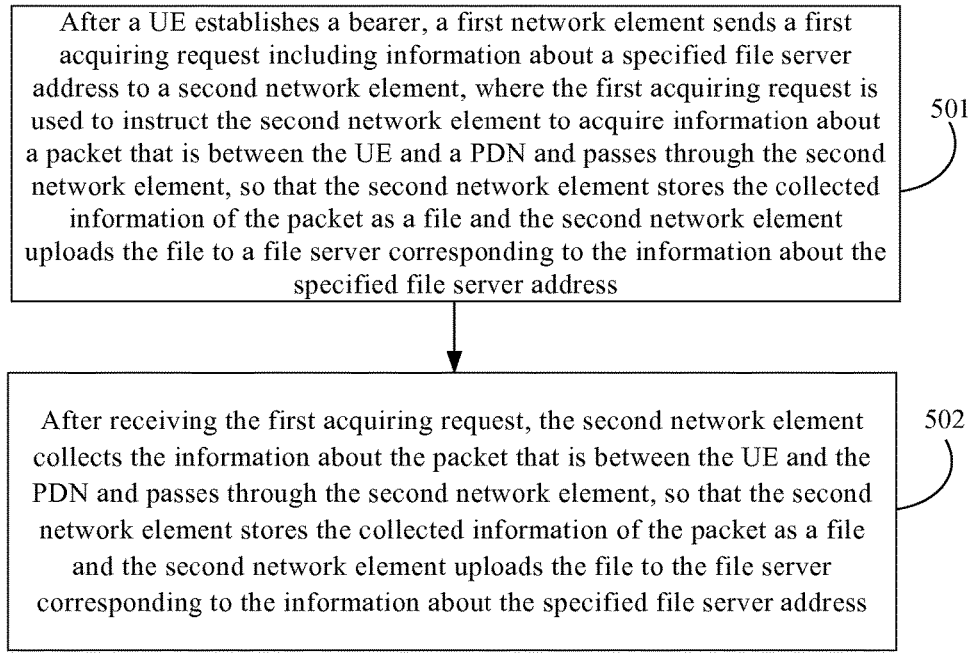
Figure 5B:
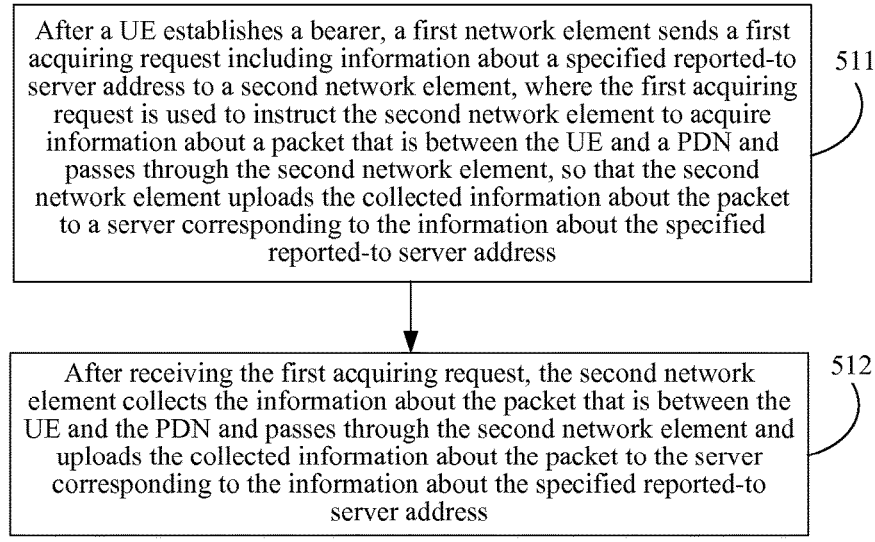

In another possible implementation manner, the first acquiring request includes at least information about a specified file server address, as described in an embodiment shown in FIG. 5A; or the first acquiring request includes at least information about a specified reported-to server address, as described in an embodiment shown in FIG. 5B.

FIG. 5A shows a method for acquiring information about a packet according to an embodiment of the present invention. As shown in FIG. 5A, the method for acquiring information about a packet in this embodiment is described as follows:

501. After a UE establishes a bearer, a first network element sends a first acquiring request including information about a specified file server address to a second network element, where the first acquiring request is used to instruct the second network element to acquire information about a packet that is transmitted between the UE and a PDN and passes through the second network element, so that the second network element stores the collected information about the packet as a file and the second network element uploads the file to a file server corresponding to the information about the specified file server address.

502. After receiving the first acquiring request, the second network element collects the information about the packet that is transmitted between the UE and the PDN and passes through the second network element, so that the second network element stores the collected information about the packet as a file and the second network element uploads the file to the file server corresponding to the information about the specified file server address.

In a practical application, before the step of "uploading the file to the file server corresponding to the information about the specified file server address" in step 502, the second network element further needs to establish a data transmission channel with the file server according to the information about the specified file server address.

For example, the first network element is a PCRF, the second network element is a PCEF, a BBERF, or a TDF; or the first network element is a second capability exposure system, and the second network element is a gateway or a base station.

Optionally, the first acquiring request includes an identifier of the UE.

Definitely, in a practical application, the first network element may further carry, in the first acquiring request, a parameter, such as a type of a specified file server, a user name, a password, a file format, an upper limit of a file size, an upper limit of a duration corresponding to a file, an upper limit of the number of files, a file encryption algorithm and parameter, a file naming rule, or a time period for uploading a file and/or an upper limit of a delay for uploading a file. This embodiment is used only as an example for description.

In addition, the type of the file server includes but is not limited to the FTP, the TFTP, and the like.

FIG. 5B shows a method for acquiring information about a packet according to an embodiment of the present invention. As shown in FIG. 5B, the method for acquiring information about a packet in this embodiment is described as follows:

511. After a UE establishes a bearer, a first network element sends a first acquiring request including information about a specified reported-to server address to a second network element, where the first acquiring request is used to instruct the second network element to acquire information about a packet that is transmitted between the UE and a PDN and passes through the second network element, so that the second network element uploads the collected information about the packet to a server corresponding to the information about the specified reported-to server address.

512. After receiving the first acquiring request, the second network element collects the information about the packet that is transmitted between the UE and the PDN and passes through the second network element and uploads the collected information about the packet to the server corresponding to the information about the specified reported-to server address.

In a practical application, before the step of "uploading the collected information about the packet to the server corresponding to the information about the specified reported-to server address" in step 512, the second network element further needs to establish a data transmission channel with the server according to the information about the specified reported-to server address.

Figure 5C:
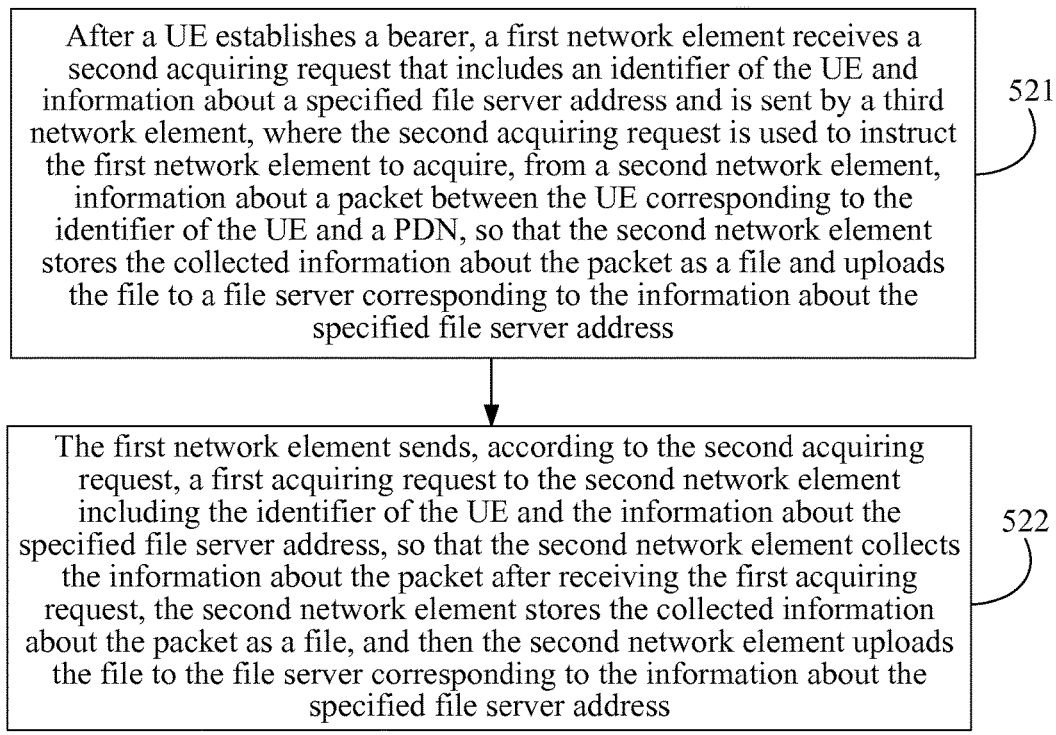

Optionally, the first acquiring request may further include an identifier of the UE, as shown in FIG. 5C. FIG. 5C shows a method for acquiring information about a packet according to an embodiment of the present invention. The method for acquiring information about a packet in this embodiment is described as follows:

521. After a UE establishes a bearer, a first network element receives a second acquiring request that includes an identifier of the UE and information about a specified file server address and is sent by a third network element, where the second acquiring request is used to instruct the first network element to acquire, from a second network element, information about a packet between the UE corresponding to the identifier of the UE and a PDN, so that the second network element stores the collected information about the packet as a file and uploads the file to a file server corresponding to the information about the specified file server address.

522. The first network element sends, according to the second acquiring request, a first acquiring request to the second network element including the identifier of the UE and the information about the specified file server address, so that the second network element collects the information about the packet after receiving the first acquiring request, the second network element stores the collected information about the packet as a file, and then the second network element uploads the file to the file server corresponding to the information about the specified file server address.

Definitely, after receiving the first acquiring request, the second network element may establish a data transmission channel with the file server according to the information about the specified file server address in the first acquiring request, and further the second network element collects the information about the packet corresponding to the identifier of the UE, stores the collected information about the packet as a file, and uploads the file, through the data transmission channel, to the file server corresponding to the information about the specified file server address.

Definitely, in a practical application, the second acquiring request that is sent by the third network element and received by the first network element carries a parameter, such as a type of a specified file server, a user name, a password, a file format, an upper limit of a file size, an upper limit of a duration corresponding to a file, an upper limit of the number of files, a file encryption algorithm and parameter, a file naming rule, or a time period for uploading a file and/or an upper limit of a delay for uploading a file. This embodiment is used only an example for description.

In addition, the type of the file server includes but is not limited to the File Transfer Protocol (File Transfer Protocol, FTP for short), the Trivial File Transfer Protocol (Trivial FTP, TFTP for short), and the like.

For example, the third network element is an AF, the first network element is a PCRF, and the second network element is a PCEF, a BBERF, or a TDF; or the third network element may be a first capability exposure system, the first network element is a PCRF, and the second network element is a PCEF; or the third network element is an AF, the first network element may be a second capability exposure system, and the second network element is a gateway or a base station.

It should be noted that if the third network element is an AF, the first network element is a PCRF, and the second network element is a PCEF, a BBERF, or a TDF, the second acquiring request and the first acquiring request may not include the identifier of the UE. In this case, the second acquiring request may be a second acquiring request that is sent by the AF to the PCRF through a data transmission channel established when the UE establishes a session, and the first acquiring request may be a first acquiring request that is sent by the PCRF to the PCEF/BBERF/TDF through a data transmission channel between the PCRF and the PCEF/BBERF/TDF, where the data transmission channel is established when the UE establishes the session.

Therefore, when the third network element is an AF, the AF may analyze information about a packet of each UE in the file server and further adjusts a service according to the information about the packet of each UE.

FIG. 5D shows a method for acquiring information about a packet according to an embodiment of the present invention. As shown in FIG. 5D, the method for acquiring information about a packet in this embodiment is described as follows:

531. After a UE establishes a bearer, a first network element receives a second acquiring request that includes an identifier of the UE and information about a specified reported-to server address and is sent by a third network element, where the second acquiring request is used to instruct the first network element to acquire, from a second network element, information about a packet corresponding to the identifier of the UE, so that the second network element reports the collected information about the packet corresponding to the identifier of the UE to a server corresponding to the information about the specified reported-to server address.

532. The first network element sends a first acquiring request including the identifier of the UE and the information about the specified reported-to server address to the second network element according to the second acquiring request, so that the second network element, after receiving the first acquiring request, collects the information about the packet corresponding to the identifier of the UE, and the second network element reports the information about the packet to the server corresponding to the information about the specified reported-to server address.

Refer to descriptions in other embodiments. After receiving the first acquiring request, the second network element establishes a data transmission channel with the server according to the information about the specified reported-to server address in the first acquiring request, so that the second network element collects the information about the packet corresponding to the identifier of the UE and uploads, through the data transmission channel, the collected information about the packet to the server corresponding to the information about the specified reported-to server address.

For example, if the third network element is an AF, the first network element is a PCRF, and the second network element is a PCEF, a BBERF, or a TDF, the second acquiring request and the first acquiring request may not include the identifier of the UE. In this case, the second acquiring request may be a second acquiring request that is sent by the AF to the PCRF through a data transmission channel established when the UE establishes a session, and the first acquiring request may be a first acquiring request that is sent by the PCRF to the PCEF/BBERF/TDF through a data transmission channel between the PCRF and the PCEF/BBERF/TDF, where the data transmission channel is established when the UE establishes the session.

In any one of the foregoing embodiments, the third network element may be an AF or a first capability exposure system; the first network element may be a PCRF or a second capability exposure system; and the second network element may be a PCEF, a TDF, a BBERF, a gateway, or a base station.

The information about the packet in any one of the foregoing embodiments may include: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, all or part of content of the packet, and the like.

The packet statistics information includes one or more types of the following information:

statistics information about the number of packets, statistics information about the number of packets of different packet lengths, packet traffic statistics information, QoS statistics information, and the like, where the QoS statistics information includes but is not limited to a maximum bandwidth, a minimum bandwidth, an average bandwidth, an available bandwidth, the number of lost packets, a packet loss rate, jitter, a delay, and the like.

In another embodiment, the first acquiring request sent by the first network element to the second network element includes at least a filtering condition or indication information. In this case, the first network element sends, to the second network element, the first acquiring request carrying the filtering condition, where the first acquiring request is used to instruct the second network element to acquire, according to the filtering condition, the information about the packet that is transmitted between the UE and the PDN and passes through the second network element;

or the first network element sends, to the second network element, the first acquiring request carrying the indication information, where the first acquiring request is used to instruct the second network element to acquire, according to the indication information, the information about the packet that is transmitted between the UE and the PDN and passes through the second network element.

In addition, if the first network element receives the second acquiring request, the second acquiring request includes at least the filtering condition and/or the indication information. Correspondingly, the first network element sends the first acquiring request to the second network element according to the second acquiring request including the filtering condition, and in this case, the first acquiring request includes the filtering condition; or the first network element sends the first acquiring request to the second network element according to the second acquiring request including the indication information, and in this case, the first acquiring request includes the indication information, so that the second network element acquires, according to the filtering condition or the indication information, the information about the packet transmitted between the UE and the PDN and passes through the second network element.

For example, the filtering condition includes one or more types of the following information: an application type, IP quintuple information, a packet direction, a discarded packet, an acceptable packet, and a time period; and the indication information includes one or more types of the following information:

a sampling rate, the total number of samples, a sampling period, an upper limit of the number of sampled packets in unit time, an upper limit of sampled traffic in unit time, an upper limit of a packet content length, a frequency for performing packet statistics collection, a frequency for reporting information about a packet, the number of times of reporting information about a packet, a network element for performing packet information statistics collection, a condition for ending acquiring of information about a packet, and the like.

The condition for ending acquiring of information about a packet includes: time, the number of packets, that packet traffic reaches a preset value, that the number of sampled packets reaches a preset threshold, that sampled packet traffic reaches another preset threshold, or the like. Content of the filtering condition and the indication information in this embodiment is a brief example, and other content that may belong to the filtering condition or the indication information shall fall within the scope of this embodiment.

FIG. 6A shows a method for acquiring information about a packet according to an embodiment of the present invention. As shown in FIG. 6A, the method for acquiring information about a packet in this embodiment is described as follows:

601. After a UE establishes a bearer, a PCRF receives a second acquiring request sent by an AF, where the second acquiring request is used to instruct the PCRF to acquire, from a PCEF, information about a packet that is transmitted between the UE and a PDN and passes through the PCEF.

For example, the information about the packet includes: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, and all or part of content of the packet.

The packet statistics information includes one or more types of the following information:

statistics information about the number of packets, statistics information about the number of packets of different packet lengths, packet traffic statistics information, QoS statistics information, and the like, where the QoS statistics information includes but is not limited to a maximum bandwidth, a minimum bandwidth, an average bandwidth, an available bandwidth, the number of lost packets, a packet loss rate, jitter, a delay, and the like.

602. The PCRF sends a first acquiring request to the PCEF according to the second acquiring request, so that the PCEF collects, according to the first acquiring request, the information about the packet that is transmitted between the UE and the PDN and passes through the PCEF.

603. The PCRF receives the information about the packet, where the information about the packet is collected by the PCEF and sent by the PCEF.

604. The PCRF sends the information about the packet to the AF.

In a practical application, before step 602, the method for acquiring information about a packet may further include the following step 602a that is not shown in the figure.

602a. The PCRF checks, according to pre-acquired subscription information of the UE, whether authorization information of the UE exists.

The authorization information of the UE is information that the UE allows providing of the information about the packet transmitted between the UE and the PDN.

Generally, when the UE establishes the bearer, the PCRF may pre-acquire the subscription information of the UE.

In another embodiment, the PCRF may check, according to the subscription information of the UE that is acquired from an SPR/UDR/HSS or according to the subscription information of the UE that is acquired from an operator policy configured on the PCRF, and then according to the subscription information of the UE, whether the authorization information of the UE exists. If no authorization information of the UE exists in the subscription information of the UE, the PCRF sends a message to the AF, so as to instruct the AF to reject the second acquiring request and no longer perform a subsequent step.

In addition, optionally, the PCEF collects statistics on, according to the first acquiring request of the PCRF, the information about the packet corresponding to an identifier of the UE and reports the information about the packet to the PCRF. The foregoing step 603 and step 604 may be performed multiple times, and the information about the packet may be reported multiple times.

In a first possible implementation manner, the AF may specify a filtering condition for a packet whose information needs to be acquired and the filtering condition includes but is not limited to: an application type, IP quintuple information, a packet direction (uplink, downlink, or uplink and downlink), a discarded packet, an acceptable packet, a time period, and the like.

That is, the second acquiring request includes a filtering condition, for example, the PCRF receives a second acquiring request that includes the filtering condition and is sent by the AF, where the filtering condition is as described in the foregoing. Correspondingly, the first acquiring request also includes the filtering condition, for example, the PCRF sends the first acquiring request including the filtering condition to the PCEF according to the second acquiring request, so that the PCEF may collect information about a packet that meets the filtering condition and further report the information about the packet that meets the filtering condition to the AF by using the PCRF.

In a second possible implementation manner, the AF may further specify, by using indication information, a type of packet information that needs to be acquired, where the indication information includes but is not limited to a sampling rate, the total number of samples, a sampling period, an upper limit of the number of sampled packets in unit time, an upper limit of sampled traffic in unit time, an upper limit of a packet content length, a frequency for performing packet statistics collection, a frequency for reporting information about a packet, the number of times of reporting information about a packet, the number of packets, that packet traffic reaches a preset threshold, that the number of sampled packets reaches a preset threshold, that sampled packet traffic reaches another preset threshold, a network element for performing packet information statistics collection, and the like.

For each type of packet information, the indication information may further specify that uplink, downlink, or total statistics information needs to be acquired. The indication information may be first indication information described in the following.

It may be understood that the second acquiring request may include first indication information, for example, the PCRF receives the second acquiring request that includes the first indication information and is sent by the AF, where the first indication information is used to indicate a type of packet information that the AF needs to acquire, and the first indication information is content described in the foregoing examples. Correspondingly, the first acquiring request may also include the first indication information, for example, the PCRF sends the first acquiring request including the first indication information to the PCEF according to the second acquiring request, so that the PCEF may collect information about a packet that meets the first indication information and further report the information about the packet that meets the first indication information to the AF by using the PCRF.

In a third possible implementation manner, the AF may further specify, by using second indication information, a reporting frequency and/or the number of reporting times, for example, a time interval for reporting, the number of packets for reporting each time, the amount of traffic for reporting each time, the number of sampled packets for reporting each time, and the amount of sampled traffic for reporting each time, and the total number of reporting times. If the AF does not specify the reporting frequency and/or the number of reporting times, the PCEF reports information about a single packet and/or packet statistics information at any time.

Therefore, the second acquiring request includes the second indication information, for example, the PCRF receives the second acquiring request that includes the second indication information and is sent by the AF, where the second indication information is used to indicate a frequency and/or the number of times of reporting performed by the PCEF, and the second indication information is content described in the foregoing examples. Correspondingly, the first acquiring request also includes the second indication information, for example, the PCRF sends, according to the second acquiring request, the first acquiring request that includes the second indication information to the PCEF, so that the PCEF reports the collected information about the packet to the AF by using the PCRF according to the second indication information.

In a fourth possible implementation manner, the AF may specify, by using third indication information, a condition for ending acquiring of information about a packet, where the third indication information includes time, the number of packets, that packet traffic reaches a threshold, the number of sampled packets, that sampled packet traffic reaches a threshold, or the like. Therefore, the second acquiring request includes the third indication information, for example, the PCRF receives the second acquiring request that includes the third indication information and is sent by the AF, where the third indication information is used to indicate a condition for the PCEF to end collecting of information about a packet, and the third indication information is content described in the foregoing examples. Correspondingly, the first acquiring request also includes the third indication information, for example, the PCRF sends, according to the second acquiring request, the first acquiring request that includes the third indication information to the PCEF, so that the PCEF collects, according to the third indication information, the information about the packet corresponding to the identifier of the UE and further reports the collected information about the packet to the AF by using the PCRF. Optionally, during packet information collection, the PCEF reports traffic information once when a packet information ending condition specified by the third indication information is satisfied.

In a fifth possible implementation manner, the AF may further specify a network element for acquiring statistics information, which includes but is not limited to a PCEF, a BBERF, and a TDF. If the network element for acquiring statistics information is specified, the PCEF in a subsequent step is substituted by a specified network element. If the network element for acquiring statistics information is not specified, the PCRF acquires statistics information from the PCEF by default, and one exception is as follows: When the filtering condition specified by the AF includes an application type (such as a video type, an audio type, or a text type), and if the PCEF does not have a DPI function, the PCRF acquires packet statistics information from the TDF. For simplification, only the PCEF is shown in FIG. 6A.

It may be understood that in a case that the AF does not specify any indication information or filtering condition, the PCRF performs an operation according to default system setting.

Figure 6B:
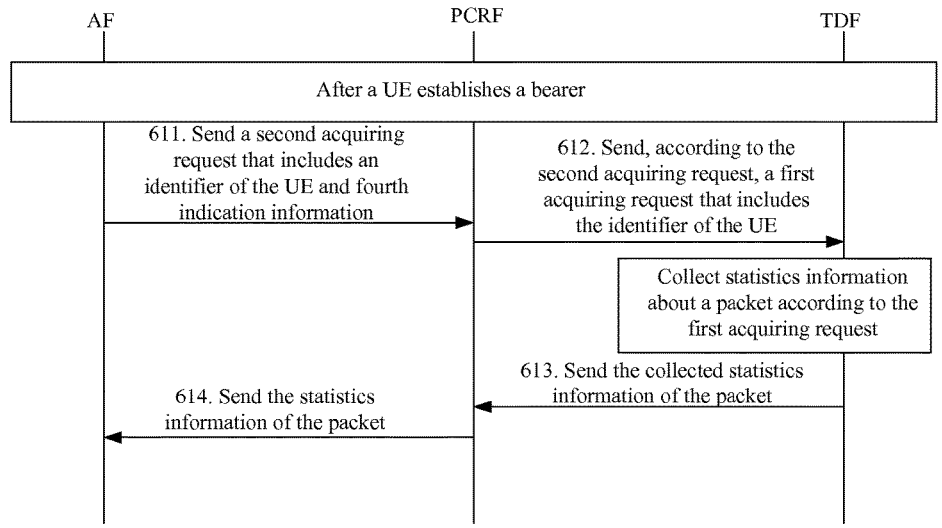

For example, as shown in FIG. 6B, the method for acquiring information about a packet in this embodiment includes:

611. After a UE establishes a bearer, a PCRF receives a second acquiring request that includes an identifier of the UE and fourth indication information and is sent by an AF, where the second acquiring request is used to instruct the PCRF to acquire, from a TDF, statistics information about a packet that is between the UE corresponding to the identifier of the UE and a PDN and passes through the TDF.

It may be understood that the fourth indication information instructs the PCRF to acquire the statistics information about the packet from the TDF.

612. The PCRF sends a first acquiring request including the identifier of the UE to the TDF according to the second acquiring request, so that the TDF collects, according to the first acquiring request, the statistics information about the packet corresponding to the identifier of the UE.

613. The PCRF receives the statistics information about the packet corresponding to the identifier of the UE, where the statistics information about the packet is collected by the TDF and sent by the TDF.

614. The PCRF sends the statistics information of the packet to the AF.

Definitely, in a practical application, the second acquiring request in the foregoing step 611 may not include the identifier of the UE and correspondingly, the first acquiring request in step 612 may not include the identifier of the UE either.

With reference to FIG. 3, in this embodiment, in step 601 and step 602 and in step 611 and step 612, message exchange between the AF and the PCRF may reuse an Rx session established before, or may establish a new independent session. If a new independent session is established, the AF needs to provide the identifier of the UE, which includes but is not limited to an IP address, an APN, an IMSI, an MSISDN, and the like of the UE, so that the PCRF can be associated with a corresponding Gx session, Gxx session, or Sd session.

Figure 6C:
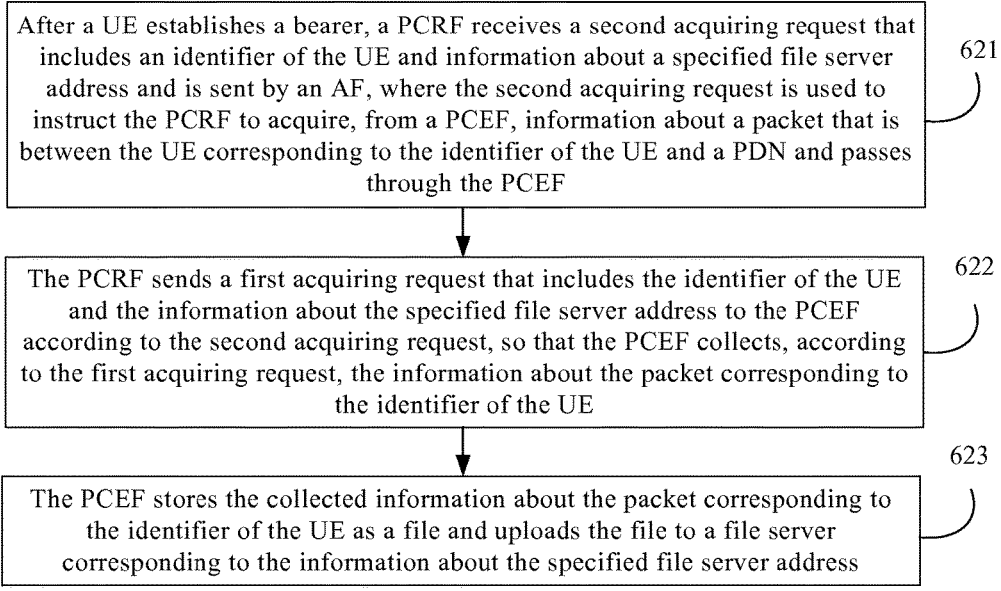

FIG. 6C shows a method for acquiring information about a packet according to an embodiment of the present invention. As shown in FIG. 6C, the method for acquiring information about a packet in this embodiment is described as follows:

621. After a UE establishes a bearer, a PCRF receives a second acquiring request that includes an identifier of the UE and information about a specified file server address and is sent by an AF, where the second acquiring request is used to instruct the PCRF to acquire, from a PCEF, information about a packet that is between the UE corresponding to the identifier of the UE and a PDN and passes through the PCEF.

For example, the information about the packet includes: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, all or part of content of the packet, and the like.

The packet statistics information includes one or more types of the following information:

statistics information about the number of packets, statistics information about the number of packets of different packet lengths, packet traffic statistics information, QoS statistics information, and the like, where the QoS statistics information includes but is not limited to a maximum bandwidth, a minimum bandwidth, an average bandwidth, an available bandwidth, the number of lost packets, a packet loss rate, jitter, a delay, and the like.

622. The PCRF sends a first acquiring request that includes the identifier of the UE and the information about the specified file server address to the PCEF according to the second acquiring request, so that the PCEF collects, according to the first acquiring request, the information about the packet corresponding to the identifier of the UE.

For example, the identifier of the UE includes but is not limited to an IP address, an APN, an IMSI, an MSISDN, and the like of the UE.

623. The PCEF stores the collected information about the packet corresponding to the identifier of the UE as a file and uploads the file to a file server corresponding to the information about the specified file server address.

That is, the PCEF collects statistics on the information about the packet according to a request of the PCRF, stores the information about the packet as a file, and uploads the file to the specified file server. Step 623 may be performed multiple times to upload multiple files.

For example, the information about the file server address includes but is not limited to an IP address, a port number, a domain name, and the like of the file server.

It should be noted that if the information about the file server address is a domain name, the PCEF further needs to acquire the IP address of the file server according to the domain name, so as to establish a data transmission channel with the file server according to the IP address and further upload one or more files to the file server.

Optionally, the AF may carry, in the sent second acquiring request, a parameter, such as a type of a specified file server, a user name, a password, a file format, an upper limit of a file size, an upper limit of a duration corresponding to a file, an upper limit of the number of files, a file encryption algorithm and parameter, a file naming rule, a time period for uploading a file, or an upper limit of a delay for uploading a file. The type of the file server includes but is not limited to the FTP, the TFTP, and the like.

Further, the AF may further specify, in the sent second acquiring request, a parameter relating to establishment of an encryption data transmission channel between the PCEF and the file server, such as a parameter relating to the Internet Protocol Security (Internet Protocol Security, IPSec for short).

Definitely, in another embodiment, the method for acquiring information about a packet may further include the following step 624 to step 626 that are not shown in the figure.

624. The PCRF receives a second packet information cancellation request that includes the identifier of the UE and is sent by the AF, where the second packet information cancellation request is used to instruct the PCRF to send, to the PCEF, a first packet information cancellation request for canceling acquiring of the information about the packet corresponding to the identifier of the UE.

625. The PCRF sends the first packet information cancellation request including the identifier of the UE to the PCEF according to the second packet information cancellation request, so that the PCEF, after receiving the first packet information cancellation request, cancels an operation of collecting the information about the packet corresponding to the identifier of the UE.

It should be noted that if the PCEF, before receiving the first packet information cancellation request, further collects the information about the packet corresponding to the identifier of the UE, optionally, the PCEF may further write the collected information about the packet to a file and upload the file to the file server.

Figure 6D:
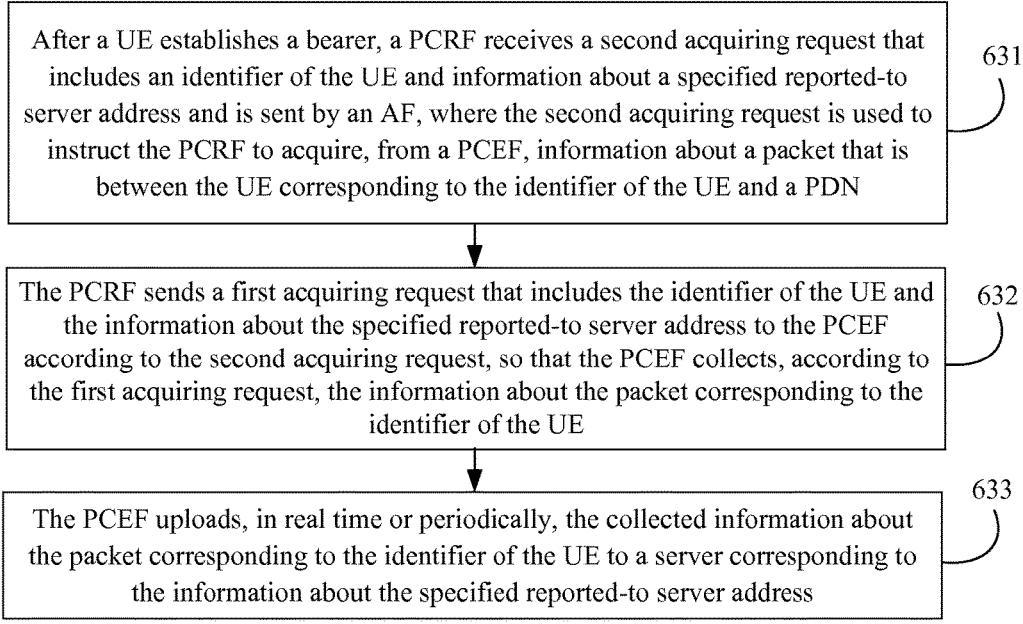

FIG. 6D shows a method for acquiring information about a packet according to an embodiment of the present invention. As shown in FIG. 6D, the method for acquiring information about a packet in this embodiment is described as follows:

631. After a UE establishes a bearer, a PCRF receives a second acquiring request that includes an identifier of the UE and information about a specified reported-to server address and is sent by an AF, where the second acquiring request is used to instruct the PCRF to acquire, from a PCEF, information about a packet that is between the UE corresponding to the identifier of the UE and a PDN.

For example, the information about the packet includes: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, all or part of content of the packet, and the like.

The packet statistics information includes one or more types of the following information:

statistics information about the number of packets, statistics information about the number of packets of different packet lengths, packet traffic statistics information, QoS statistics information, and the like, where the QoS statistics information includes but is not limited to a maximum bandwidth, a minimum bandwidth, an average bandwidth, an available bandwidth, the number of lost packets, a packet loss rate, jitter, a delay, and the like.

632. The PCRF sends a first acquiring request that includes the identifier of the UE and the information about the specified reported-to server address to the PCEF according to the second acquiring request, so that the PCEF collects, according to the first acquiring request, the information about the packet corresponding to the identifier of the UE.

For example, the identifier of the UE includes but is not limited to an IP address, an APN, an IMSI, an MSISDN, and the like of the UE.

633. The PCEF uploads, in real time or periodically, the collected information about the packet corresponding to the identifier of the UE to a server corresponding to the information about the specified reported-to server address.

The related server is not shown in the figure.

In this embodiment, the AF sends, to the PCRF, a second acquiring request for requesting acquiring of information about a packet, and further specifies a parameter, such as information about a reported-to server address, in the second acquiring request. Correspondingly, the PCRF sends, to the PCEF, a first acquiring request for requesting acquiring of information about a packet, and further specifies a parameter, such as information about a reported-to server, in the first acquiring request. The PCEF reports, in real time or in quasi real time, for example, periodically, collected information about a packet to a specified server according to an instruction of the PCRF.

Optionally, the AF may further carry, in the second acquiring request, a parameter that is required for establishment of a data transmission channel between the PCEF and the specified reported-to server and is specified by the AF, which includes a type of an adopted protocol and a related parameter, where the type of the protocol includes but is not limited to the TCP, the UDP, the IPSec, the TLS, the SSL, and the HTTP.

In another embodiment, the AF may further carry, in the second acquiring request, a format of information about a packet to be reported, where the format is specified by the AF.

Specifically, operations that the PCEF collects the information about the packet and reports the information about the packet to the server can be performed multiple times.

According to the method for acquiring information about a packet in the foregoing embodiment, a PCRF receives a second acquiring request of an AF and further acquires, from a PCEF, information about a packet that is between a UE and a PDN and passes through the PCEF, and then the AF may acquire information about a packet, where the information about the packet is collected by the PCEF. In this way, a problem that a PCC system cannot acquire information about a packet relating to a user equipment in the prior art is solved.

Figure 7A:
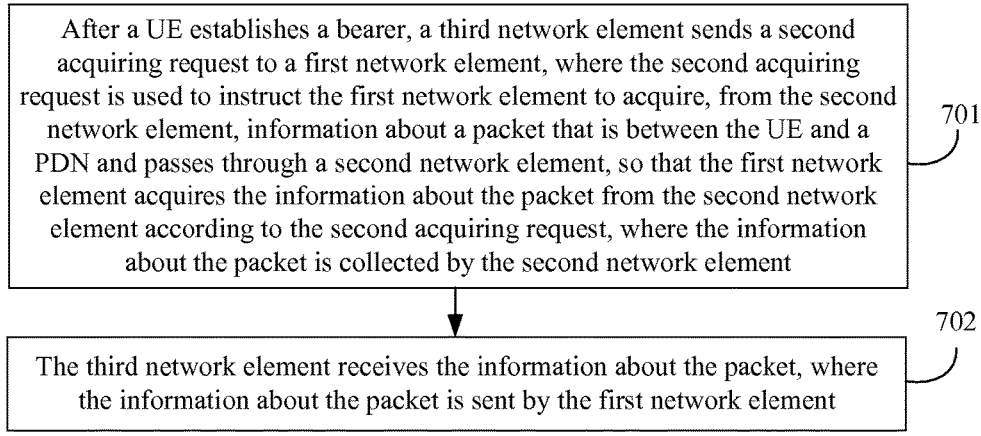
FIG. 7A to FIG. 7B are schematic flowcharts of methods for acquiring information about a packet according to another embodiment of the present invention.

FIG. 7A shows a method for acquiring information about a packet according to another embodiment of the present invention. As shown in FIG. 7A, the method for acquiring information about a packet in this embodiment is described as follows:

701. After a UE establishes a bearer, a third network element sends a second acquiring request to a first network element, where the second acquiring request is used to instruct the first network element to acquire, from a second network element, information about a packet that is transmitted between the UE and a PDN and passes through the second network element, so that the first network element acquires the information about the packet from the second network element according to the second acquiring request, where the information about the packet is collected by the second network element.

702. The third network element receives the information about the packet, where the information about the packet is sent by the first network element.

Optionally, the second acquiring request includes at least an identifier of the UE; and correspondingly, the third network element sends the second acquiring request to the first network element, which includes:

sending, by the third network element, the second acquiring request including the identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

Figure 7B:
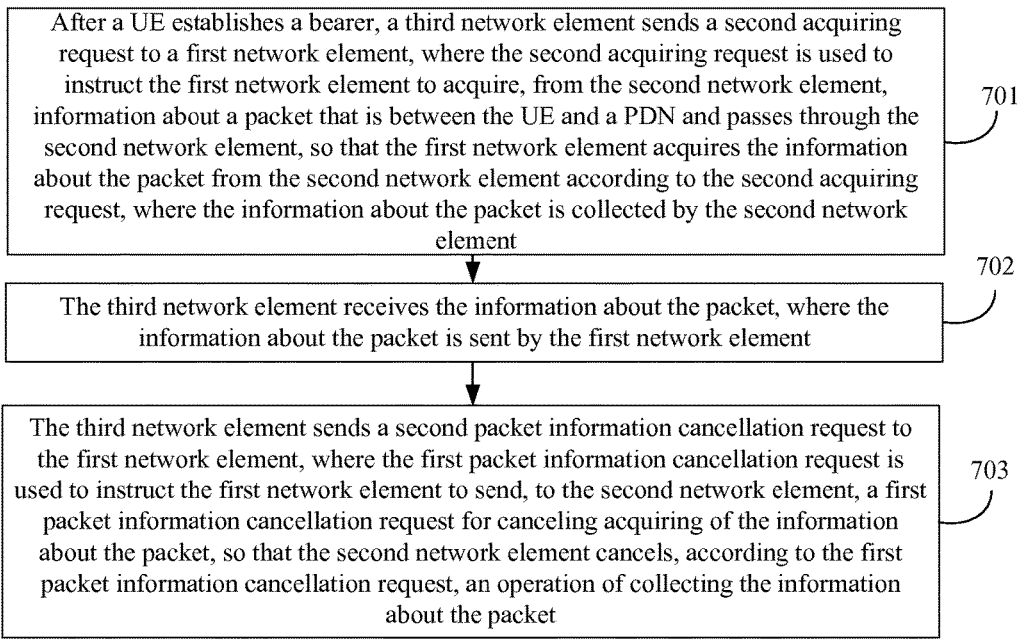

Based on the embodiment shown in FIG. 7A, the method for acquiring information about a packet in this embodiment may further include the following step 703, as shown in FIG. 7B.

703. The third network element sends a second packet information cancellation request to the first network element, where the first packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

In an optional application scenario, the second acquiring request in the foregoing step 701 includes at least information about a specified reported-to server address; and correspondingly, the third network element sends the second acquiring request to the first network element, which includes:

sending, by the third network element, the second acquiring request including the information about the specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

In another optional application scenario, the second acquiring request in foregoing step 701 includes at least information about a specified file server address; and correspondingly, the third network element sends the second acquiring request to the first network element, which includes:

sending, by the third network element, the second acquiring request including the information about the specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

In another optional application scenario, the second acquiring request in the foregoing step 701 further includes a filtering condition or indication information; and correspondingly, the third network element sends the second acquiring request to the first network element, which includes:

sending, by the third network element, the second acquiring request including the filtering condition to the first network element, where:

the second acquiring request is used to instruct the first network element to acquire, from the second network element according to the filtering condition, the information about the packet that is transmitted between the UE and the PDN and passes through the second network element;

or the third network element sends the second acquiring request to the first network element, which includes:

sending, by the third network element, the second acquiring request including the indication information to the first network element, where the second acquiring request is used to instruct the first network element to acquire, from the second network element according to the indication information, the information about the packet that is transmitted between the UE and the PDN and passes through the second network element.

For example, the third network element may be an AF or a first capability exposure system;

the first network element may be a PCRF or a second capability exposure system; and the second network element may be a PCEF, a TDF, a BBERF, a gateway, or a base station.

In any one of the foregoing embodiments, the information about the packet may include: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, and all or part of content of the packet.

The packet statistics information includes one or more types of the following information:

statistics information about the number of packets, statistics information about the number of packets of different packet lengths, packet traffic statistics information, and QoS statistics information, where the QoS statistics information includes but is not limited to a maximum bandwidth, a minimum bandwidth, an average bandwidth, an available bandwidth, the number of lost packets, a packet loss rate, jitter, a delay, and the like.

The filtering condition may include one or more types of the following information:

an application type, IP quintuple information, a packet direction, a discarded packet, an acceptable packet, or a time period.

The indication information includes one or more types of the following information:

a sampling rate, the total number of samples, a sampling period, an upper limit of the number of sampled packets in unit time, an upper limit of sampled traffic in unit time, an upper limit of a packet content length, a frequency for performing packet statistics collection, a frequency for reporting information about a packet, the number of times of reporting information about a packet, a network element for performing packet information statistics collection, a condition for ending acquiring of information about a packet, and the like.

The condition for ending acquiring of information about a packet includes: time, the number of packets, that packet traffic reaches a preset value, that the number of sampled packets reaches a preset threshold, that sampled packet traffic reaches another preset threshold, or the like.

According to the method for acquiring information about a packet in the foregoing embodiment, a third network element sends a second acquiring request to a first network element, so that a second network element acquires information about a packet that is between a UE and a PDN and passes through the second network element, and therefore the third network element may acquire information about a packet, where the information about the packet is collected by the second network element. In this way, a problem that a PCC system cannot acquire information about a packet relating to a user equipment in the prior art is solved.

Figure 8A:
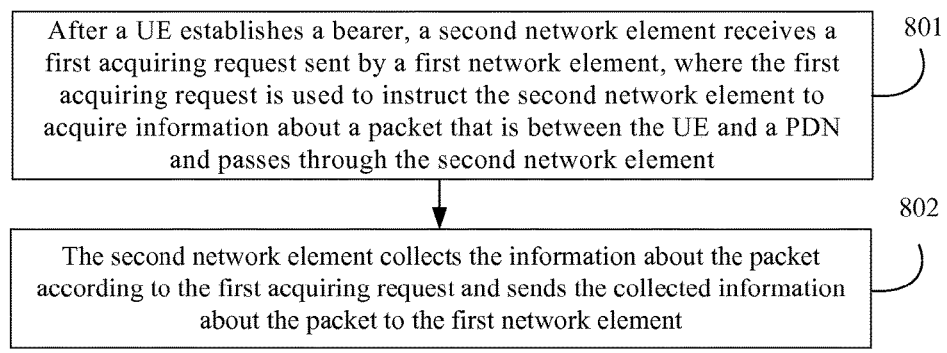
FIG. 8A to FIG. 8B are schematic flowcharts of methods for acquiring information about a packet according to another embodiment of the present invention.

FIG. 8A shows a method for acquiring information about a packet according to another embodiment of the present invention. As shown in FIG. 8A, the method for acquiring information about a packet in this embodiment is described as follows:

801. After a UE establishes a bearer, a second network element receives a first acquiring request sent by a first network element, where the first acquiring request is used to instruct the second network element to acquire information about a packet that is transmitted between the UE and a PDN and passes through the second network element.

802. The second network element collects the information about the packet according to the first acquiring request and sends the collected information about the packet to the first network element.

In an optional application scenario, the first acquiring request may be sent by the first network element after the first network element receives a second acquiring request sent by a third network element.

Correspondingly, after receiving the information about the packet, where the information about the packet is sent by the second network element, the first network element sends the information about the packet to the third network element.

In another optional application scenario, the first acquiring request includes at least an identifier of the UE, and correspondingly, the second network element receives the first acquiring request that includes the identifier of the UE and is sent by the first network element, where the first acquiring request is used to instruct the second network element to acquire the information about the packet that is between the UE corresponding to the identifier of the UE and the PDN and passes through the second network element.

Correspondingly, step 802 may specifically be as follows: The second network element collects, according to the first acquiring request, the information about the packet corresponding to the identifier of the UE and sends the collected information about the packet to the first network element.

In a third optional application scenario, the first acquiring request in step 801 includes at least information about a specified file server address; and correspondingly, the second network element receives the first acquiring request that includes the information about the specified file server address and is sent by the first network element; and step 802 may specifically be as follows: The second network element collects the information about the packet according to the first acquiring request, stores the collected information about the packet as a file, and uploads the file to a file server corresponding to the information about the specified file server address.

For example, in the foregoing specific step 802, before the step of uploading the file to a file server corresponding to the information about the specified file server address, the method for acquiring information about a packet further includes:

M01. The second network element collects the information about the packet according to the first acquiring request and stores the collected information about the packet as a file, and the second network element establishes a data transmission channel with the file server according to the information about the specified file server address; and correspondingly, the file is uploaded, through the data transmission channel, to the file server corresponding to the information about the specified file server address.

In a fourth optional application scenario, the first acquiring request in step 801 includes at least information about a specified reported-to server address;

correspondingly, the second network element receives the first acquiring request that includes the information about the specified reported-to server address and is sent by the first network element; and step 802 may specifically be as follows: The second network element collects the information about the packet according to the first acquiring request and uploads the collected information about the packet to a server corresponding to the information about the specified reported-to server address.

For example, in the foregoing specific step 802, before the step of uploading the collected information about the packet to a server corresponding to the information about the specified reported-to server address, the method for acquiring information about a packet further includes:

S01: The second network element establishes a data transmission channel with the server according to the information about the specific reported-to server address; and further, the second network element collects the information about the packet according to the first acquiring request and uploads, through the data transmission channel, the collected information about the packet to the server corresponding to the information about the specified reported-to server address.

In a fifth optional application scenario, the first acquiring request in step 801 includes at least a filtering condition or indication information;

correspondingly, the second network element receives the first acquiring request that includes the filtering condition and is sent by the first network element; and step 802 may specifically be as follows: The second network element collects the information about the packet according to the filtering condition in the first acquiring request;

or the second network element receives the first acquiring request that includes the indication information and is sent by the first network element; and step 802 may specifically be as follows: The second network element collects the information about the packet according to the indication information in the first acquiring request.

Figure 8B:
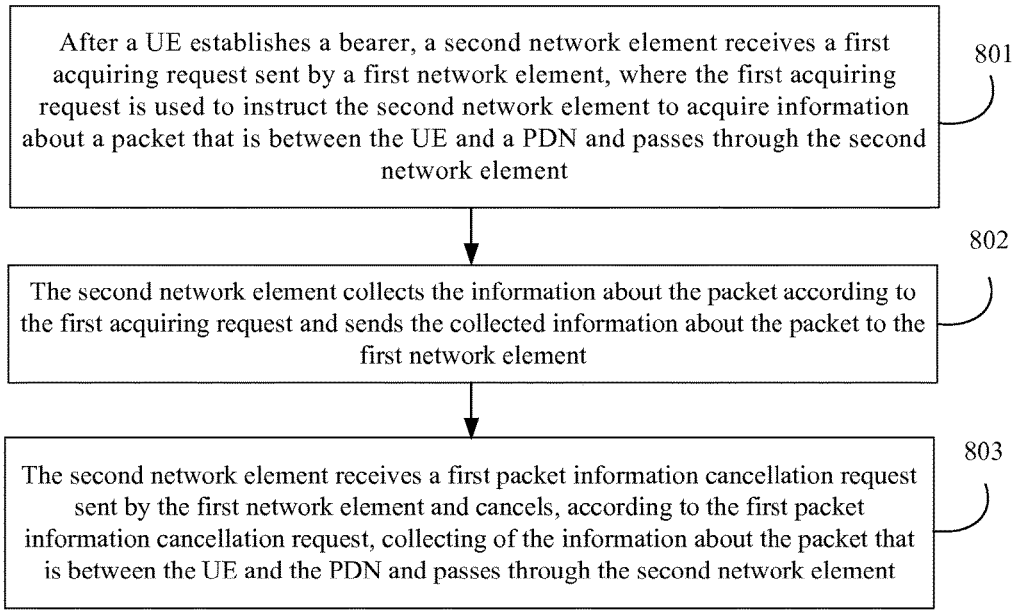

Based on the embodiment shown in FIG. 8A, the method for acquiring information about a packet further includes the following step 803, as shown in FIG. 8B.

803. The second network element receives a first packet information cancellation request sent by the first network element and cancels, according to the first packet information cancellation request, collecting of the information about the packet that is transmitted between the UE and the PDN and passes through the second network element.

In an application scenario, the first packet information cancellation request may be sent by the first network element after the first network element receives a second packet information cancellation request sent by the third network element.

For example, the third network element may be an AF or a first capability exposure system;

the first network element may be a PCRF or a second capability exposure system; and the second network element may be a PCEF, a TDF, a BBERF, a gateway, or a base station.

The information about the packet may include: information about a single packet and/or packet statistics information.

The information about the single packet includes one or more types of the following information:

a packet sequence number, a packet direction, a packet receiving time stamp, a packet sending time stamp, a packet size, a packet header field, information about whether the packet is discarded, all or part of content of the packet, and the like.

The packet statistics information includes one or more types of the following information:

statistics information about the number of packets, statistics information about the number of packets of different packet lengths, packet traffic statistics information, QoS statistics information, and the like, where the QoS statistics information includes but is not limited to a maximum bandwidth, a minimum bandwidth, an average bandwidth, an available bandwidth, the number of lost packets, a packet loss rate, jitter, a delay, and the like.

With the method for acquiring information about a packet in the foregoing embodiment, a problem that a PCC system cannot acquire information about a packet relating to a user equipment in the prior art is solved.

Figure 9:
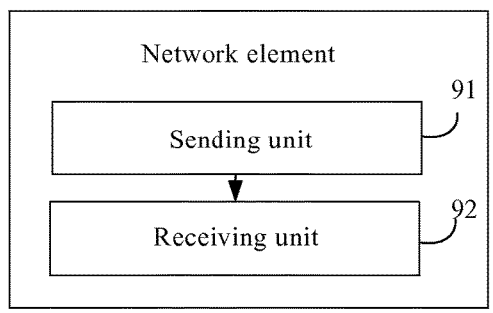
FIG. 9 is a schematic structural diagram of a network element according to another embodiment of the present invention.

FIG. 9 is a schematic structural diagram of a network element according to an embodiment of the present invention. As shown in FIG. 9, the network element in this embodiment includes a sending unit 91 and a receiving unit 92.

The sending unit 91 is configured to, after a UE establishes a bearer, send a first acquiring request to a second network element, where the first acquiring request is used to instruct the second network element to acquire information about a packet that is transmitted between the UE and a packet data network PDN and passes through the second network element.

The receiving unit 92 is configured to, after the sending unit 91 sends the first acquiring request, receive information about a packet, where the information about the packet is sent by the second network element, and the information about the packet is collected by the second network element according to the first acquiring request.

Optionally, the receiving unit 92 is further configured to, before the sending unit 91 sends the first acquiring request, receive a second acquiring request sent by a third network element, where the second acquiring request is used to instruct the network element to acquire, from the second network element, the information about the packet that is transmitted between the UE and the PDN and passes through the second network element; and correspondingly, the sending unit 91 is specifically configured to, after the receiving unit 92 receives the second acquiring request, send the first acquiring request to the second network element according to the second acquiring request; and further configured to send the information about the packet to the third network element, where the information about the packet is received by the receiving unit 92.

In an application scenario, the sending unit 91 is specifically configured to send the first acquiring request including an identifier of the UE to the second network element, where the first acquiring request is used to instruct the second network element to acquire the information about the packet that is between the UE corresponding to the identifier of the UE and the PDN and passes through the second network element.

In another possible application scenario, the receiving unit 92 is specifically configured to, before the sending unit 91 sends the first acquiring request, receive the second acquiring request that includes an identifier of the UE and is sent by the third network element, where the second acquiring request is used to instruct the network element to acquire, from the second network element, the information about the packet that is between the UE corresponding to the identifier of the UE and the PDN and passes through the second network element; and the sending unit 91 is specifically configured to, after the receiving unit receives the second acquiring request, send, according to the second acquiring request, the first acquiring request including the identifier of the UE to the second network element, where the first acquiring request is used to instruct the second network element to acquire the information about the packet that is between the UE corresponding to the identifier of the UE and the PDN and passes through the second network element.

In a third possible application scenario, the receiving unit 92 is further configured to, after the sending unit 91 sends the information about the packet, receive a second packet information cancellation request that includes the identifier of the UE and is sent by the third network element, where the second packet information cancellation request is used to instruct the network element to send a first packet information cancellation request to the second network element, so that the second network element cancels, according to the first packet information cancellation request, acquiring of the information about the packet corresponding to the identifier of the UE; and the sending unit 91 is configured to, after the receiving unit 92 receives the second packet information cancellation request, send the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

Specifically, if the second network element, before receiving the first packet information cancellation request, further collects the information about the packet that is between the UE corresponding to the identifier of the UE and the PDN and passes through the second network element, the receiving unit 92 is further configured to, after the sending unit 91 sends the first packet information cancellation request, receive the information about the packet, where the information about the packet is collected by the second network element and sent by the second network element; and the sending unit 91 is further configured to send the information about the packet to the third network element, where the information about the packet is received by the receiving unit 92.

In a fourth possible application scenario, the network element may further include a determining unit 93 not shown in the figure, where:

the determining unit 93 is configured to, after the receiving unit 92 receives the second acquiring request and before the sending unit 91 sends the first acquiring request, determine that authorization information of the UE exists in subscription information of the UE, where:

the authorization information of the UE is information that the UE allows providing of the information about the packet transmitted between the UE and the PDN.

In a fifth possible application scenario, the network element may further include an acquiring unit 94 and a determining unit 93 that are not shown in the figure, where:

the acquiring unit 94 is configured to, after the receiving unit 92 receives the second acquiring request and before the sending unit 91 sends the first acquiring request, acquire, from a subscription profile repository SPR or a user data repository UDR according to the identifier of the UE, subscription information of the UE corresponding to the identifier of the UE; and the determining unit 93 is configured to, after the acquiring unit 94 acquires the subscription information of the UE, determine that authorization information of the UE exists in the subscription information of the UE, where:

the authorization information of the UE is information that the UE allows providing of the information about the packet transmitted between the UE and the PDN.

In a sixth possible application scenario, the sending unit 91 is further configured to, after the receiving unit 92 receives the second acquiring request and before the sending unit 91 sends the first acquiring request, send an authorization request to the UE corresponding to the identifier of the UE, where the authorization request includes information that the UE allows providing of the information about the packet transmitted between the UE and the PDN; and if the UE allows the providing of the information about the packet transmitted between the UE and the PDN, the receiving unit is further configured to, after the sending unit sends the authorization request, receive authorization information of the UE that is sent by the UE according to the authorization request, where:

the authorization information of the UE is the information that the UE allows the providing of the information about the packet transmitted between the UE and the PDN.

In a seventh possible application scenario, the sending unit 91 is specifically configured to send the first acquiring request including information about a specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

In an eighth possible application scenario, the receiving unit 92 is configured to, before the sending unit 91 sends the first acquiring request, receive the second acquiring request that includes information about a specified file server address and is sent by the third network element, where the second acquiring request is used to instruct the network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address; and the sending unit 91 is configured to, after the receiving unit 92 receives the second acquiring request including the information about the specified file server address, send the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to the file server corresponding to the information about the specified file server address.

In a ninth possible application scenario, the sending unit 91 is specifically configured to send the first acquiring request including information about a specified reported-to server address to the second network element, where the first acquiring request is used to instruct the second network element to acquire the information about the packet that is transmitted between the UE and the PDN and passes through the second network element, so that the second network element uploads the collected information about the packet to a server corresponding to the information about the specified reported-to server address.

In a tenth possible application scenario, the receiving unit 92 is configured to, before the sending unit 91 sends the first acquiring request, receive the second acquiring request that includes information about a specified reported-to server address and is sent by the third network element, where the second acquiring request is used to instruct the network element to acquire, from the second network element, the information about the packet that is transmitted between the UE and the PDN and passes through the second network element, so that the second network element uploads the collected information about the packet to a server corresponding to the information about the specified reported-to server address; and the sending unit 91 is configured to, after the receiving unit 92 receives the second acquiring request including the information about the specified reported-to server address, send the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to the server corresponding to the information about the specified reported-to server address.

In this embodiment, the third network element is an AF. In this case, the network element is a PCRF or a second capability exposure system, and the second network element is a PCEF, a TDF, a BBERF, a gateway, or a base station.

If the third network element is a first capability exposure system, the network element is a PCRF, and the second network element may be a PCEF, a TDF, a BBERF, or the like.

In an eleventh possible application scenario, the sending unit 91 is configured to send the first acquiring request including a filtering condition to the second network element, where the first acquiring request is used to instruct the second network element to acquire, according to the filtering condition, the information about the packet that is transmitted between the UE and the PDN and passes through the second network element;

or configured to send the first acquiring request including indication information to the second network element, where the first acquiring request is used to instruct the second network element to acquire, according to the indication information, the information about the packet that is transmitted between the UE and the PDN and passes through the second network element.

In a twelfth possible application scenario, the receiving unit 92 is configured to, before the sending unit 91 sends the first acquiring request, receive the second acquiring request that includes a filtering condition and is sent by the third network element, where the second acquiring request is used to instruct the network element to acquire, from the second network element, the information about the packet that is transmitted between the UE and the PDN and passes through the second network element, where the information about the packet is collected by the second network element according to the filtering condition; and the sending unit 91 is configured to, after the receiving unit 92 receives the second acquiring request including the filtering condition, send the first acquiring request including the filtering condition to the second network element, where the first acquiring request is used to instruct the second network element to acquire, according to the filtering condition, the information about the packet that is transmitted between the UE and the PDN and passes through the second network element;

or the receiving unit 92 is configured to, before the sending unit 91 sends the first acquiring request, receive the second acquiring request that includes indication information and is sent by the third network element, where the second acquiring request is used to instruct the network element to acquire, from the second network element, the information about the packet that is transmitted between the UE and the PDN and passes through the second network element, where the information about the packet is collected by the second network element according to the indication information; and the sending unit 91 is configured to, after the receiving unit 92 receives the second acquiring request including the indication information, send the first acquiring request including the indication information, where the first acquiring request is used to instruct the second network element to acquire, according to the indication information, the information about the packet that is transmitted between the UE and the PDN and passes through the second network element.

The network element may be located in a PCC system. The network element, by using the method for acquiring information about a packet, can solve a problem that a PCC system cannot acquire information about a packet relating to a user equipment in the prior art.

According to another aspect of the present invention, an embodiment further provides a network element. In this embodiment, a sending unit in the network element is configured to, after a UE establishes a bearer, send a second acquiring request to a first network element, where the second acquiring request is used to instruct the first network element to acquire, from a second network element, information about a packet that is transmitted between the UE and a PDN and passes through the second network element, so that the first network element acquires the information about the packet from the second network element according to the second acquiring request, where the information about the packet is collected by the second network element; and a receiving unit is configured to, after the sending unit sends the second acquiring request, receive the information about the packet, where the information about the packet is collected by the second network element and sent by the first network element.

Optionally, the sending unit may specifically be configured to, after the UE establishes the bearer, send the second acquiring request including an identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

In an application scenario, the sending unit is further configured to, after the receiving unit receives the information about the packet, send a second packet information cancellation request to the first network element, where the second packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

In another application scenario, the sending unit is specifically configured to, after the UE establishes the bearer, send the second acquiring request including information about a specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

In a third possible application scenario, the sending unit is specifically configured to, after the UE establishes the bearer, send the second acquiring request including information about a specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

In this embodiment of the present invention, the network element may be an AF or a first capability exposure system; and particularly, if the network element is an AF, the first network element may be a PCRF or a third capability exposure system, and the second network element may be a PCEF, a TDF, a BBERF, a gateway, or a base station.

In a fourth possible application scenario, the sending unit is specifically configured to, after the UE establishes the bearer, send the second acquiring request including a filtering condition to the first network element, where the second acquiring request is used to instruct the first network element to acquire, from the second network element according to the filtering condition, the information about the packet that is transmitted between the UE and the PDN and passes through the second network element; or after the UE establishes the bearer, send the second acquiring request including indication information to the first network element, where the second acquiring request is used to instruct the first network element to acquire, from the second network element according to the indication information, the information about the packet that is transmitted between the UE and the PDN and passes through the second network element.

The network element may be located in a PCC system. The network element, by using the method for acquiring information about a packet, can solve a problem that a PCC system cannot acquire information about a packet relating to a user equipment in the prior art.

Figure 10:
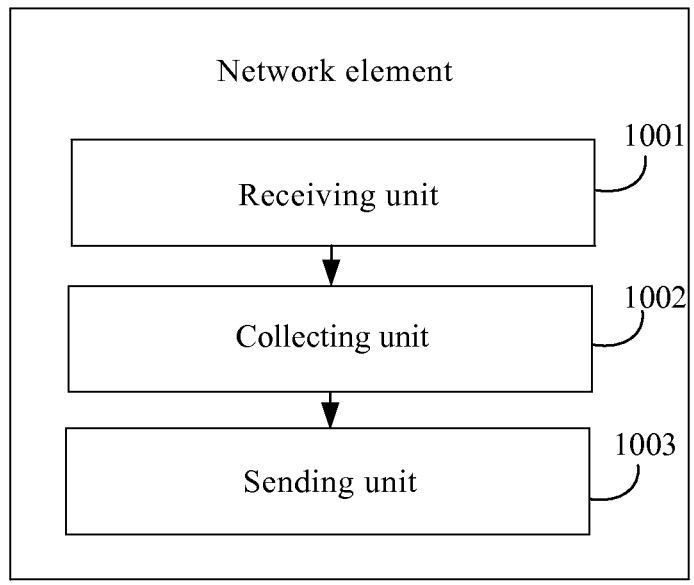
FIG. 10 is a schematic structural diagram of a network element according to another embodiment of the present invention.

According to still another aspect of the present invention, an embodiment further provides a network element shown in FIG. 10, including: a receiving unit 1001, a collecting unit 1002, and a sending unit 1003, where:

the receiving unit 1001 is configured to, after a UE establishes a bearer, receive a first acquiring request sent by a first network element, where the first acquiring request is used to instruct the network element to acquire information about a packet that is transmitted between the UE and a PDN and passes through the network element;

the collecting unit 1002 is configured to, after the receiving unit 1001 receives the first acquiring request, collects the information about the packet according to the first acquiring request; and the sending unit 1003 is configured to send the information about the packet to the first network element, where the information about the packet is collected by the collecting unit 1002.

Optionally, the receiving unit 1001 is further configured to receive a first packet information cancellation request sent by the first network element.

In this embodiment, the first acquiring request is sent by the first network element after the first network element receives a second acquiring request sent by a third network element.

In a possible application scenario, the receiving unit 1001 is specifically configured to, after the UE establishes the bearer, receive the first acquiring request that includes an identifier of the UE and is sent by the first network element, where the first acquiring request is used to instruct the network element to acquire the information about the packet that is between the UE corresponding to the identifier of the UE and the packet data network PDN and passes through the network element; and the collecting unit 1002 is specifically configured to, after the receiving unit 1001 receives the first acquiring request including the identifier of the UE, collect, according to the first acquiring request, the information about the packet corresponding to the identifier of the UE.

In a second possible application scenario, the collecting unit 1002 is further configured to, after the receiving unit 1001 receives the first packet information cancellation request, cancel, according to the first packet information cancellation request, collecting of the information about the packet that is transmitted between the UE and the PDN and passes through the network element.

In this embodiment, the first packet information cancellation request is sent by the first network element after the first network element receives a second packet information cancellation request sent by the third network element.

In a third possible application scenario, the receiving unit 1001 is specifically configured to, after the UE establishes the bearer, receive the first acquiring request that includes information about a specified file server address and is sent by the first network element, where the first acquiring request is used to instruct the network element to acquire the information about the packet that is between the UE corresponding to an identifier of the UE and the packet data network PDN and passes through the network element, and to store the information about the packet as a file, so that the network element uploads the file to a file server corresponding to the information about the specified file server address;

the collecting unit 1002 is specifically configured to, after the receiving unit 1003 receives the first acquiring request including the information about the specified file server address, collect the information about the packet according to the first acquiring request, so that the network element stores the collected information about the packet as a file; and the sending unit 1003 is further configured to upload the file stored by the collecting unit 1002 to the file server corresponding to the information about the specified file server address;

or the receiving unit 1001 is specifically configured to, after the UE establishes the bearer, receive the first acquiring request that includes information about a specified reported-to server address and is sent by the first network element, where the first acquiring request is used to instruct the network element to acquire the information about the packet that is between the UE corresponding to an identifier of the UE and the packet data network PDN and passes through the network element, and to upload the collected information about the packet to a server corresponding to the information about the specified reported-to server address;

the collecting unit 1002 is specifically configured to, after the receiving unit 1001 receives the first acquiring request including the information about the specified reported-to server address, collect the information about the packet according to the first acquiring request; and the sending unit 1003 is further configured to upload the information about the packet to the server corresponding to the information about the specified reported-to server address, where the information about the packet is collected by the collecting unit 1002.

In a fourth possible application scenario, the network element may further include an establishing unit 1004 not shown in the figure, where the establishing unit 1004 is configured to, before the sending unit 1003 sends the file stored by the collecting unit 1002, establish a data transmission channel with the file server according to the information about the specified file server address;

or the establishing unit 1004 is configured to, before the sending unit 1003 sends the information about the packet, establish a data transmission channel with the server according to the information about the specified reported-to server address, where the information about the packet is collected by the collecting unit 1002.

In a fifth possible application scenario, the receiving unit 1001 is configured to, after the UE establishes the bearer, receive the first acquiring request that includes a filtering condition and is sent by the first network element, where the first acquiring request is used to instruct the network element to acquire, according to the filtering condition, the information about the packet that is between the UE corresponding to an identifier of the UE and the packet data network PDN and passes through the network element;

or configured to, after the UE establishes the bearer, receive the first acquiring request that includes indication information and is sent by the first network element, where the first acquiring request is used to instruct the network element to acquire, according to the indication information, the information about the packet that is between the UE corresponding to an identifier of the UE and the packet data network PDN and passes through the network element.

In this embodiment of the present invention, the third network element may be an AF, the first network element may be a PCRF or a second capability exposure system, and the network element is a PCEF, a TDF, a BBERF, a gateway, a base station, or the like; or the third network element may be a first capability exposure system, the first network element may be a PCRF, and the network element is a PCEF, a TDF, a BBERF, a gateway, a base station, or the like.

The network element shown in FIG. 10 may be a PCEF, a TDF, or a BBERF.

The network element may be located in a PCC system. The network element, by using the method for acquiring information about a packet, can solve a problem that a PCC system cannot acquire information about a packet relating to a user equipment in the prior art.

Figure 11:
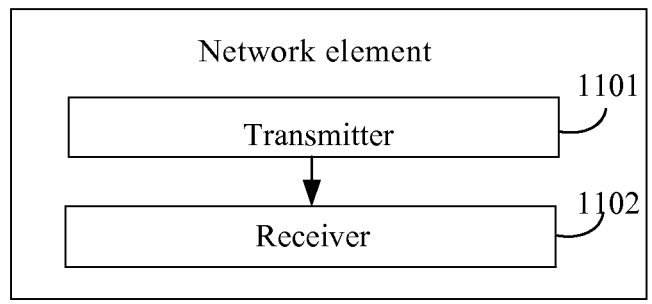
FIG. 11 is a schematic structural diagram of a network element according to another embodiment of the present invention.

FIG. 11 is a schematic structural diagram of a network element according to another embodiment of the present invention. The network element shown in FIG. 11 includes a transmitter 1101 and a receiver 1102, where:

the transmitter 1101 is configured to, after a user equipment UE establishes a bearer, send a first acquiring request to a second network element, where the first acquiring request is used to instruct the second network element to acquire information about a packet that is transmitted between the UE and a PDN and passes through the second network element; and the receiver 1102 is configured to, after the transmitter 1101 sends the first acquiring request, receive information about a packet, where the information about the packet is sent by the second network element, and the information about the packet is collected by the second network element according to the first acquiring request.

Optionally, the receiver 1102 is further configured to, before the transmitter 1101 sends the first acquiring request, receive a second acquiring request sent by a third network element, where the second acquiring request is used to instruct the network element to acquire, from the second network element, the information about the packet that is transmitted between the UE and the PDN and passes through the second network element; and the transmitter 1101 is specifically configured to, after the receiver 1102 receives the second acquiring request, send the first acquiring request to the second network element according to the second acquiring request; and is further configured to send the information about the packet to the third network element, where the information about the packet is received by the receiver 1102.

For example, the network element may be a PCRF or a capability exposure system.

In a possible application scenario, the transmitter 1101 is specifically configured to send the first acquiring request including an identifier of the UE to the second network element, where the first acquiring request is used to instruct the second network element to acquire the information about the packet that is between the UE corresponding to the identifier of the UE and the PDN and passes through the second network element.

In a second possible application scenario, the receiver 1102 is specifically configured to, before the transmitter 1101 sends the first acquiring request, receive a second acquiring request that includes an identifier of the UE and is sent by the third network element, where the second acquiring request is used to instruct the network element to acquire, from the second network element, the information about the packet that is between the UE corresponding to the identifier of the UE and the PDN and passes through the second network element; and the transmitter 1101 is specifically configured to, after the receiver 1102 receives the second acquiring request, send, according to the second acquiring request, the first acquiring request including the identifier of the UE to the second network element, where the first acquiring request is used to instruct the second network element to acquire the information about the packet that is between the UE corresponding to the identifier of the UE and the PDN and passes through the second network element.

In a third possible application scenario, the receiver 1102 is further configured to, after the transmitter 1101 sends the information about the packet, receive a second packet information cancellation request that includes the identifier of the UE and is sent by the third network element, where the second packet information cancellation request is used to instruct the network element to send a first packet information cancellation request to the second network element, so that the second network element cancels, according to the first packet information cancellation request, acquiring of the information about the packet, where the information about the packet is the information about the packet corresponding to the identifier of the UE; and the transmitter 1101 is configured to, after the receiver 1102 receives the second packet information cancellation request, send the first packet information cancellation request including the identifier of the UE to the second network element, so that the second network element, after receiving the first packet information cancellation request, cancels collecting of the information about the packet that is between the UE corresponding to the identifier of the UE and the PDN and passes through the second network element.

In a fourth possible application scenario, if the second network element, before receiving the first packet information cancellation request, further collects the information about the packet that is between the UE corresponding to the identifier of the UE and the PDN and passes through the second network element, the receiver 1102 is further configured to, after the transmitter 1101 sends the first packet information cancellation request, receive the information about the packet, where the information about the packet is collected by the second network element and sent by the second network element; and the transmitter 1101 is further configured to send the information about the packet to the third network element, where the information about the packet is received by the receiver 1102.

In a fifth possible application scenario, the network element may further include a processor not shown in the figure, where the processor is configured to, after the receiver 1102 receives the second acquiring request and before the transmitter 1101 sends the first acquiring request, determine that authorization information of the UE exists in subscription information of the UE, where:

the authorization information of the UE is information that the UE allows providing of the information about the packet transmitted between the UE and the PDN.

In a sixth possible application scenario, the processor is configured to, after the receiver receives the second acquiring request and before the transmitter sends the first acquiring request, acquire, from a subscription profile repository SPR or a user data repository UDR according to the identifier of the UE, subscription information of the UE corresponding to the identifier of the UE, and determine that authorization information of the UE exists in the subscription information of the UE, where:

the authorization information of the UE is information that the UE allows providing of the information about the packet transmitted between the UE and the PDN.

In a seventh possible application scenario, the transmitter 1101 is further configured to, after the receiver 1102 receives the second acquiring request and before the transmitter 1101 sends the first acquiring request, send an authorization request to the UE corresponding to the identifier of the UE, where the authorization request includes information that the UE allows providing of the information about the packet transmitted between the UE and the PDN;

if the UE allows the providing of the information about the packet transmitted between the UE and the PDN, the receiver is further configured to, after the transmitter sends the authorization request, receive authorization information of the UE that is sent by the UE according to the authorization request, where:

the authorization information of the UE is the information that the UE allows the providing of the information about the packet transmitted between the UE and the PDN.

In an eighth possible application scenario, the transmitter 1101 is specifically configured to send the first acquiring request including information about a specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

In a ninth possible application scenario, the receiver 1102 is configured to, before the transmitter 1101 sends the first acquiring request, receive the second acquiring request that includes information about a specified file server address and is sent by the third network element, where the second acquiring request is used to instruct the network element to acquire, from the second network element, the information about the packet that is transmitted between the UE and the PDN and passes through the second network element, so that the second network stores the collected information about the packet as a file and then the second network element uploads the file to a file server corresponding to the information about the specified file server address; and the transmitter 1101 is configured to, after the receiver 1102 receives the second acquiring request including the information about the specified file server address, send the first acquiring request including the information about the specified file server address to the second network element, where the first acquiring request is used to instruct the second network element to acquire the information about the packet that is transmitted between the UE and the PDN and passes through the second network element, so that the second network element stores the collected information about the packet as a file and then the second network element uploads the file to the file server corresponding to the information about the specified file server address.

In a tenth possible application scenario, the transmitter 1101 is specifically configured to send the first acquiring request including information about a specified reported-to server address to the second network element, where the first acquiring request is used to instruct the second network element to acquire the information about the packet that is transmitted between the UE and the PDN and passes through the second network element, so that the second network element uploads the collected information about the packet to a server corresponding to the information about the specified reported-to server address.

In an eleventh possible application scenario, the receiver 1102 is configured to, before the transmitter 1101 sends the first acquiring request, receive the second acquiring request that includes information about a specified reported-to server address and is sent by the third network element, where the second acquiring request is used to instruct the network element to acquire, from the second network element, the information about the packet that is transmitted between the UE and the PDN and passes through the second network element, so that the second network uploads the collected information about the packet to a server corresponding to the information about the specified reported-to server address; and the transmitter 1101 is configured to, after the receiver 1102 receives the second acquiring request including the information about the specified reported-to server address, send the first acquiring request including the information about the specified reported-to server address to the second network element, where the first acquiring request is used to instruct the second network element to acquire the information about the packet that is transmitted between the UE and the PDN and passes through the second network element, so that the second network element uploads the collected information about the packet to the server corresponding to the information about the specified reported-to server address.

The third network element may be an AF or a first capability exposure system, the network element may be a PCRF or a second capability exposure system, and the second network element may be a PCEF, a TDF, a BBERF, a gateway, a base station, or the like.

In a twelfth possible application scenario, the transmitter 1101 is configured to send the first acquiring request including a filtering condition to the second network element, where the first acquiring request is used to instruct the second network element to acquire, according to the filtering condition, the information about the packet that is transmitted between the UE and the PDN and passes through the second network element;

or configured to send the first acquiring request including indication information to the second network element, where the first acquiring request is used to instruct the second network element to acquire, according to the indication information, the information about the packet that is transmitted between the UE and the PDN and passes through the second network element.

In a thirteenth possible application scenario, the receiver 1102 is configured to, before the transmitter 1101 sends the first acquiring request, receive the second acquiring request that includes a filtering condition and is sent by the third network element, where the second acquiring request is used to instruct the network element to acquire, from the second network element, the information about the packet that is transmitted between the UE and the PDN and passes through the second network element, where the information about the packet is collected by the second network element according to the filtering condition; and the transmitter 1101 is configured to, after the receiver receives the second acquiring request including the filtering condition, send the first acquiring request including the filtering condition to the second network element, where the first acquiring request is used to instruct the second network element to acquire, according to the filtering condition, the information about the packet that is transmitted between the UE and the PDN and passes through the second network element;

or the receiver 1102 is configured to, before the transmitter 1101 sends the first acquiring request, receive the second acquiring request that includes indication information and is sent by the third network element, where the second acquiring request is used to instruct the network element to acquire, from the second network element, the information about the packet that is transmitted between the UE and the PDN and passes through the second network element, where the information about the packet is collected by the second network element according to the indication information; and the transmitter 1101 is configured to, after the receiver 1102 receives the second acquiring request including the indication information, send the first acquiring request including the indication information, where the first acquiring request is used to instruct the second network element to acquire, according to the indication information, the information about the packet that is transmitted between the UE and the PDN and passes through the second network element.

The network element may be located in a PCC system. The network element, by using the method for acquiring information about a packet, can solve a problem that a PCC system cannot acquire information about a packet relating to a user equipment in the prior art.

According to another aspect of an embodiment of the present invention, this embodiment of the present invention further provides a network element, where the network element includes a transmitter and a receiver, where:

the transmitter is configured to, after a user equipment UE establishes a bearer, send a second acquiring request to a first network element, where the second acquiring request is used to instruct the first network element to acquire, from a second network element, information about a packet that is transmitted between the UE and a packet data network PDN and passes through the second network element, so that the first network element acquires the information about the packet from the second network element according to the second acquiring request, where the information about the packet is collected by the second network element; and the receiver is configured to, after the transmitter sends the second acquiring request, receive the information about the packet, where the information about the packet is collected by the second network element and sent by the first network element.

In an optional application scenario, the transmitter is specifically configured to, after the UE establishes the bearer, send the second acquiring request including an identifier of the UE to the first network element, where the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, where the information about the packet is collected by the second network element.

For example, the network element may be an AF or a capability exposure system.

In a second possible application scenario, the transmitter is further configured to, after the receiver receives the information about the packet, send a second packet information cancellation request to the first network element, where the second packet information cancellation request is used to instruct the first network element to send, to the second network element, a first packet information cancellation request for canceling acquiring of the information about the packet, so that the second network element cancels, according to the first packet information cancellation request, an operation of collecting the information about the packet.

In a third possible application scenario, the transmitter is specifically configured to, after the UE establishes the bearer, send the second acquiring request including information about a specified reported-to server address to the first network element, where the second acquiring request is used to instruct the first network element to acquire, from the second network element, the information about the packet that is transmitted between the UE and the PDN and passes through the second network element, so that the second network element uploads the collected information about the packet to a server corresponding to the information about the specified reported-to server address.

In a fourth possible application scenario, the transmitter is specifically configured to, after the UE establishes the bearer, send the second acquiring request including information about a specified file server address to the first network element, where the second acquiring request is used to instruct the first network element to acquire, from the second network element, the information about the packet that is transmitted between the UE and the PDN and passes through the second network element, so that the second network element stores the collected information about the packet as a file and then the second network element uploads the file to a file server corresponding to the information about the specified file server address.

In this embodiment, the network element may be an AF or a first capability exposure system, the first network element may be a PCRF or a second capability exposure system, and the second network element may be a PCEF, a TDF, a BBERF, a gateway, or a base station.

In a fifth possible application scenario, the transmitter is specifically configured to, after the UE establishes the bearer, send the second acquiring request including a filtering condition to the first network element, where the second acquiring request is used to instruct the first network element to acquire, from the second network element according to the filtering condition, the information about the packet that is transmitted between the UE and the PDN and passes through the second network element; or after the UE establishes the bearer, send the second acquiring request including indication information to the first network element, where the second acquiring request is used to instruct the first network element to acquire, from the second network element according to the indication information, the information about the packet that is transmitted between the UE and the PDN and passes through the second network element.

The network element may be located in a PCC system. The network element, by using the method for acquiring information about a packet, can solve a problem that a PCC system cannot acquire information about a packet relating to a user equipment in the prior art.

Figure 12:
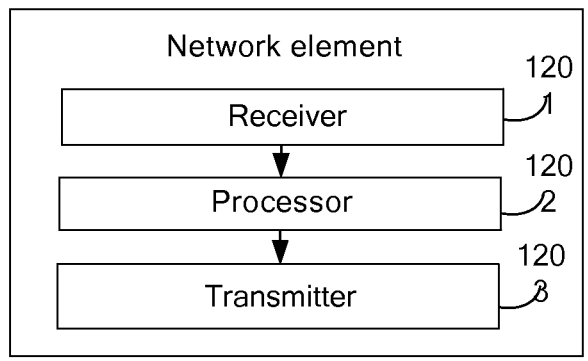
FIG. 12 is a schematic structural diagram of a network element according to another embodiment of the present invention.

According to still another aspect of an embodiment of the present invention, this embodiment of the present invention further provides a network element. As shown in FIG. 12, the network element in this embodiment includes a receiver 1201, a processor 1202, and a transmitter 1203; where:

the receiver 1201 is configured to, after a user equipment UE establishes a bearer, receive a first acquiring request sent by a first network element, where the first acquiring request is used to instruct the network element to acquire information about a packet that is transmitted between the UE and a packet data network PDN and passes through the network element;

the processor 1202 is configured to, after the receiver 1201 receives the first acquiring request, collect the information about the packet according to the first acquiring request; and the transmitter 1203 is configured to send the information about the packet to the first network element, where the information about the packet is collected by the processor 1202.

Optionally, the receiver 1201 is further configured to receive a first packet information cancellation request sent by the first network element; and correspondingly, the processor 1202 is configured to, after the receiver 1201 receives the first packet information cancellation request, cancel, according to the first packet information cancellation request, collecting of the information about the packet that is transmitted between the UE and the PDN and passes through the network element. In this embodiment, the first acquiring request is sent by the first network element after the first network element receives a second acquiring request sent by a third network element.

In an optional application scenario, the receiver 1201 is specifically configured to, after the UE establishes the bearer, receive the first acquiring request that includes an identifier of the UE and is sent by the first network element, where the first acquiring request is used to instruct the second network element to acquire the information about the packet that is between the UE corresponding to the identifier of the UE and the packet data network PDN and passes through the second network element; and the processor 1202 is specifically configured to, after the receiver 1201 receives the first acquiring request including the identifier of the UE, collect, according to the first acquiring request, the information about the packet corresponding to the identifier of the UE.

In a second optional application scenario, the receiver 1201 is configured to, after the transmitter 1203 sends the information about the packet, receive a first packet information cancellation request sent by the first network element and cancel, according to the first packet information cancellation request, collecting of the information about the packet that is transmitted between the UE and the PDN and passes through the second network element.

In a third optional application scenario, the first packet information cancellation request is sent by the first network element after the first network element receives a second packet information cancellation request sent by the third network element.

In a fourth optional application scenario, the receiver 1201 is specifically configured to, after the UE establishes the bearer, receive the first acquiring request that includes information about a specified file server address and is sent by the first network element, where the first acquiring request is used to instruct the second network element to acquire the information about the packet that is between the UE corresponding to an identifier of the UE and the packet data network PDN and passes through the second network element, to store the information about the packet as a file, and to upload the file to a file server corresponding to the information about the specified file server address;

the processor 1202 is specifically configured to, after the receiver 1201 receives the first acquiring request including the information about the specified file server address, collect the information about the packet according to the first acquiring request and store the collected information about the packet as a file; and the transmitter 1203 is further configured to upload the file stored by the processor 1202 to the file server corresponding to the information about the specified file server address;

or the receiver 1201 is specifically configured to, after the UE establishes the bearer, receive the first acquiring request that includes information about a specified reported-to server address and is sent by the first network element, where the first acquiring request is used to instruct the second network element to acquire the information about the packet that is between the UE corresponding to an identifier of the UE and the packet data network PDN and passes through the second network element, and to upload the collected information about the packet to a server corresponding to the information about the specified reported-to server address;

the processor 1202 is specifically configured to, after the receiver 1201 receives the first acquiring request including the information about the specified reported-to server address, collect the information about the packet according to the first acquiring request; and the transmitter 1203 is further configured to upload the information about the packet to the server corresponding to the information about the specified reported-to server address, where the information about the packet is collected by the processor 1202.

In a fifth optional application scenario, the processor 1202 is further configured to, before the transmitter sends the file stored by the processor 1202, establish a data transmission channel with the file server according to the information about the specified file server address;

or configured to, before the transmitter 1203 sends the information about the packet, establish a data transmission channel with the server according to the information about the specified reported-to server address, where the information about the packet is collected by the processor.

In a sixth optional application scenario, the receiver 1201 is configured to, after the UE establishes the bearer, receive the first acquiring request that includes a filtering condition and is sent by the first network element, where the first acquiring request is used to instruct the second network element to acquire, according to the filtering condition, the information about the packet that is between the UE corresponding to an identifier of the UE and the packet data network PDN and passes through the second network element;

or configured to, after the UE establishes the bearer, receive the first acquiring request that includes indication information and is sent by the first network element, where the first acquiring request is used to instruct the second network element to acquire, according to the indication information, the information about the packet that is between the UE corresponding to an identifier of the UE and the packet data network PDN and passes through the second network element.

For example, the network element may be a PCEF, a TDF, or a BBERF.

The network element may be located in a PCC system. The network element, by using the method for acquiring information about a packet, can solve a problem that a PCC system cannot acquire information about a packet relating to a user equipment in the prior art.

It should be understood that, in the foregoing embodiment of the network element, the division of each functional unit is only an exemplary description. In a practical application, the foregoing functions may be allocated, according to demands, for example, by considering a requirement of a corresponding hardware configuration or convenience in software implementation, to different functional units for completion. That is, an internal structure of the network element is divided into different functional units to complete all or a part of the foregoing described functions. Moreover, in a practical application, a corresponding functional unit in the embodiment may be implemented by corresponding hardware, or may be completed by corresponding hardware by executing corresponding software. For example, the foregoing sending module may be hardware that can execute functions of the foregoing sending unit, such as a transmitter, or may be an ordinary processor or another hardware device that can execute a corresponding computer program to complete the foregoing functions. For another example, the foregoing collecting unit may be hardware that can execute functions of the foregoing collecting unit, such as a processor, or may be another hardware device that can execute a corresponding computer program to complete the foregoing functions. For still another example, the foregoing receiving unit may be hardware that can execute functions of the foregoing receiving unit, such as a receiver, or may be an ordinary processor or another hardware device that can execute a corresponding computer program to complete the foregoing functions (the foregoing description principles may apply to all embodiments provided in the present invention).

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a ROM, a RAM, a magnetic disk or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof; however, these modifications or replacements do not make the essence of corresponding technical solutions depart from the scope of the technical solutions in the embodiments of the present invention.

What is claimed is:

1. A network element, comprising:
a transmitter, configured to, after a user equipment UE establishes a bearer and the network element determines that the UE authorizes providing information about a packet transmitted between the UE and a packet data network PDN and passes through a second network element, send a first acquiring request to the second network element, wherein the first acquiring request is used to instruct the second network element to acquire the information about the packet; and
a receiver, configured to, after the transmitter sends the first acquiring request, receive information about the packet, wherein the information about the packet is sent by the second network element, and the information about the packet is collected by the second network element according to the first acquiring request,
wherein the receiver is configured to, before the transmitter sends the first acquiring request, receive a second acquiring request that comprises a filtering condition and is sent by a third network element, wherein the second acquiring request is used to instruct the network element to acquire, from the second network element, the information about the packet that is transmitted between the UE and the PDN and passes through the second network element, wherein the information about the packet is collected by the second network element according to the filtering condition; and
the transmitter is configured to, after the receiver receives the second acquiring request comprising the filtering condition, send the first acquiring request comprising the filtering condition to the second network element, wherein the first acquiring request is use to instruct the second network element to acquire, according to the filtering condition, the information about the packet that is transmitted between the UE and the PDN and passes through the second network element; or
the receiver is configured to, before the transmitter sends the first acquiring request, receive the second acquiring request that comprises indication information and is sent by the third network element, wherein the second acquiring request is used to instruct the network element to acquire, from the second network element, the information about the packet that is transmitted between the UE and the PDN and passes through the second network element, wherein the information about the packet is collected by the second network element according to the indication information; and
the transmitter is configured to, after the receiver receives the second acquiring request comprising the indication information, send the first acquiring request comprising the indication information, wherein the first acquiring request is used to instruct the second network element to acquire, according to the indication information, the information about the packet that is transmitted between the UE and the PDN and passes through the second network element.

2. The network element according to claim 1, wherein the transmitter
further configured to send the information about the packet to the third network element, wherein the information about the packet is received by the receiver.

3. The network element according to claim 1, wherein:
the transmitter is configured to send the first acquiring request comprising information about a specified file server address to the second network element, wherein the first acquiring request is used to instruct the second network element to acquire the information about the packet that is transmitted between the UE and the PDN and passes through the second network element, so that the second network element stores the collected information about the packet as a file and then the second network element uploads the file to a file server corresponding to the information about the specified file server address.

4. The network element according to claim 1, wherein the third network element is an application function AF entity or a first capability exposure system;
the network element is a policy and charging rules function PCRF entity or a second capability exposure system; and
the second network element is a policy and charging enforcement function PCEF entity, a service detection function TDF entity, a bearing binding and event reporting function BBERF entity, a gateway, or a base station.

5. A network element, comprising:
a transmitter, configured to, after a user equipment UE establishes a bearer, send a second acquiring request to a first network element, wherein the second acquiring request is used to instruct the first network element to acquire, from a second network element, information about a packet that is transmitted between the UE and a packet data network PDN and passes through the second network element, so that the first network element, after determining that the UE authorizes providing information about the packet, acquires the information about the packet from the second network element according to the second acquiring request, wherein the information about the packet is collected by the second network element; and
a receiver, configured to, after the transmitter sends the second acquiring request, receive the information about the packet, wherein the information about the packet is collected by the second network element and sent by the first network element,
wherein the transmitter is configured to, after the UE establishes the bearer, send the second acquiring request comprising a filtering condition to the first network element, wherein the second acquiring request is used to instruct the first network element to acquire, from the second network element, the information about the packet that is transmitted between the UE and the PDN and passes through the second network element according to the filtering condition; and
the receiver is configured to receive, after the first network element sends a first acquiring request to the second network element, the information about the packet collected by the second network element according to the filtering condition from the first network element which receives the information about the packet from the second network element, wherein the information about the packet is collected by the second network element according to the filtering condition; or the transmitter is configured to, after the UE establishes the bearer, send the second acquiring request comprising indication information to the first network element, wherein the second acquiring request is used to instruct the first network element to acquire, from the second network element, the information about the packet that is transmitted between the UE and the PDN and passes through the second network element according to the indication information; and the receiver is configured to receive, after the first network element sends the first acquiring request to the second network element, the information about the packet collected by the second network element according to the indication information from the first network element which receives the information about the packet from the second network element, wherein the information about the packet is collected by the second network element according to the indication information.

6. The network element according to claim 5, wherein:
the transmitter is configured to, after the UE establishes the bearer, send the second acquiring request comprising an identifier of the UE to the first network element, wherein the second acquiring request is used to instruct the first network element to acquire, from the second network element, the information about the packet that is between the UE corresponding to the identifier of the UE and the PDN and passes through the second network element, so that the first network element acquires, from the second network element according to the second acquiring request, the information about the packet corresponding to the identifier of the UE, wherein the information about the packet is collected by the second network element.

7. The network element according to claim 5, wherein:
the transmitter is configured to, after the UE establishes the bearer, send the second acquiring request comprising information about a specified reported-to server address to the first network element, wherein the second acquiring request is used to instruct the first network element to acquire, from the second network element, and the information about the packet that is transmitted between the UE and the PDN and passes through the second network element, so that the second network element uploads the collected information about the packet to a server corresponding to the information about the specified reported-to server address.

8. The network element according to claim 5, wherein the network element is an application function AF entity or a first capability exposure system;
the first network element is a policy and charging rules function PCRF entity or a second capability exposure system; and
the second network element is a policy and charging enforcement function PCEF entity, a service detection function TDF entity, a bearer binding and event reporting function BBERF entity, a gateway, or a base station.

9. A network element, comprising:
a receiver, configured to, after a user equipment UE establishes a bearer and a first network element determines that the UE authorizes providing information about a packet transmitted between the UE and a packet data network PDN and passes through the network element, receive a first acquiring request sent by the first network element, wherein the first acquiring request is used to instruct the network element to acquire information about the packet;

a processor, configured to, after the receiver receives the first acquiring request, collect the information about the packet according to the first acquiring request; and a transmitter, configured to send the information about the packet to the first network element, wherein the information about the packet is collected by the processor, wherein the first acquiring request received by the receiver from the first network element includes a filtering condition, wherein the first acquiring request is used to instruct the network element to acquire, according to the filtering condition, the information about the packet that is transmitted between the UE and the PDN and passes through the network element, the filtering condition having been included in a second acquiring request sent by a third network element to the first network element, before the first network element sends the first acquiring request to the network element, wherein the second acquiring request is used to instruct the first network element to acquire, from the network element, the information about the packet that is transmitted between the UE and the PDN and passes through the network element; and the transmitter is configured to, after the receiver receives the first acquiring request comprising the filtering condition, send the information about the packet to the first network element, wherein the information about the packet is collected by the processor according to the filtering condition; or the first acquiring request received by the receiver from the first network element comprises indication information, wherein the first acquiring request is used to instruct the network element to acquire, according to the indication information, the information about the packet that is transmitted between the UE and the PDN and passes through the network element, the indication information having been included in a second acquiring request sent by a third network element to the first network element, before the first network element sends the first acquiring request to the network element, wherein the second acquiring request is used to instruct the first network element to acquire, from the network element, the information about the packet that is transmitted between the UE and the PDN and passes through the network element; and the transmitter is configured to, after the receiver receives the first acquiring request comprising the indication information, send the information about the packet to the first network element, wherein the information about the packet is collected by the processor according to the indication information.

10. The network element according to claim 9, wherein:
the receiver is configured to, after the UE establishes the bearer, receive the first acquiring request that comprises information about a specified file server address and is sent by the first network element, wherein the first acquiring request is used to instruct the network element to acquire the information about the packet that is between the UE corresponding to an identifier of the UE and the PDN and passes through the network element, to store the information about the packet as a file, and to upload the file to a file server corresponding to the information about the specified file server address, the processor is configured to, after the receiver receives the first acquiring request comprising the information about the specified file server address, collect the information about the packet according to the first acquiring request and store the collected information about the packet as a file; and the transmitter is further configured to upload the file stored by the process to the file server corresponding to the information about the specified file server address; or the receiver is configured to, after the UE establishes the bearer, receive the first acquiring request that comprises information about a specified reported-to server address and is sent by the first network element, wherein the first acquiring request is used to instruct the network element to acquire the information about the packet that is between the UE corresponding to an identifier of the UE and the PDN and passes through the network element, and to upload the collected information about the packet to a server corresponding to the information about the specified reported-to server address; the processor is configured to, after the receiver receives the first acquiring request comprising the information about the specified reported-to server address, wherein the information about the packet is collected by the processor.

11. The network element according to claim 9, wherein a third network element is an application function AF entity or a first capability exposure system; the first network element is a policy and charging rules function PCEF entity, a service detection function TDF entity, a bearer binding and event reporting function BBERF entity, a gateway, or a base station.

\* \* \* \* \*

UNITED STATES PATENT AND TRADEMARK OFFICE
CERTIFICATE OF CORRECTION

PATENT NO. : 10,080,156 B2
APPLICATION NO. : 14/710795
DATED : September 18, 2018
INVENTOR(S) : Shiyong Tan et al.

Page 1 of 1

It is certified that error appears in the above-identified patent and that said Letters Patent is hereby corrected as shown below:

On the Title Page

Item [56], Line 18, Delete "(Release 11k"," and insert -- (Release 11)", --, therefore.

Signed and Sealed this
Twentieth Day of November, 2018

Andrei Iancu
*Director of the United States Patent and Trademark Office*